(12) United States Patent
Hendricks et al.

(10) Patent No.: US 8,481,185 B2
(45) Date of Patent: Jul. 9, 2013

(54) CATALYST LAYERS TO ENHANCE UNIFORMITY OF CURRENT DENSITY IN MEMBRANE ELECTRODE ASSEMBLIES

(75) Inventors: Susan M. Hendricks, Cottage Grove, MN (US); Thomas Herdtle, Inver Grove Heights, MN (US); Mark K. Debe, Stillwater, MN (US); Donald J. McClure, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

(21) Appl. No.: 12/845,894

(22) Filed: Jul. 29, 2010

(65) Prior Publication Data

US 2010/0297526 A1 Nov. 25, 2010

Related U.S. Application Data

(62) Division of application No. 11/224,890, filed on Sep. 13, 2005, now Pat. No. 7,790,304.

(51) Int. Cl.
*H01M 2/00* (2006.01)

(52) U.S. Cl.
USPC ................. 429/34; 429/33; 429/38; 252/502; 252/510; 428/143

(58) Field of Classification Search
USPC .......... 429/34, 33, 38; 252/502, 510; 428/143
See application file for complete search history.

(56) References Cited

U.S. PATENT DOCUMENTS

| | | | |
|---|---|---|---|
| 4,340,276 A | 7/1982 | Maffitt et al. | |
| 4,433,082 A * | 2/1984 | Grot | 524/544 |
| 4,539,256 A | 9/1985 | Shipman | |
| 4,568,598 A | 2/1986 | Bilkadi et al. | |
| 4,726,989 A | 2/1988 | Mrozinski | |

(Continued)

FOREIGN PATENT DOCUMENTS

| | | |
|---|---|---|
| EP | 1096586 | 5/2001 |
| EP | 1381102 | 1/2004 |

(Continued)

OTHER PUBLICATIONS

Chow, "Fabrication of Biologically Based Microstructure Composites for Vacuum Field Emission", Materials Science and Engineering, A158, 1992, pp. 1-6.

(Continued)

*Primary Examiner* — Peter D. Mulcahy
*Assistant Examiner* — Henry Hu
(74) *Attorney, Agent, or Firm* — Julie Lapos-Kuchar; Gregory D. Allen

(57) ABSTRACT

Components that include catalyst layers used in membrane electrode assemblies (MEAs), and methods of making such components are described. The catalyst layers yield more uniform current distributions across the active area of the MEA during operation. The catalyst layers may have a uniform catalyst activity profile of a less active catalyst to achieve more uniform current density over the MEA active area. The catalyst layers may have a variable activity profile, such as an activity profile with a varying slope, to compensate for the inherent nonlinearities of catalyst utilization during operation of an electrochemical fuel cell. Desired variable catalyst activity profiles may be achieved, for example, by varying the catalyst loading across the MEA from inlet to outlet ports or by varying the surface area of the catalyst loading or by varying the surface area of the catalyst support elements.

7 Claims, 15 Drawing Sheets

U.S. PATENT DOCUMENTS

| | | | |
|---|---|---|---|
| 4,804,592 | A | 2/1989 | Vanderborgh et al. |
| 4,808,493 | A | 2/1989 | Breault |
| 4,812,352 | A | 3/1989 | Debe |
| 4,851,377 | A * | 7/1989 | Breault ............ 502/101 |
| 4,867,881 | A | 9/1989 | Kinzer |
| 4,940,525 | A * | 7/1990 | Ezzell et al. .......... 204/252 |
| 5,039,561 | A | 8/1991 | Debe |
| 5,082,472 | A * | 1/1992 | Mallouk et al. .......... 95/49 |
| 5,120,594 | A | 6/1992 | Mrozinski |
| 5,260,360 | A | 11/1993 | Mrozinski et al. |
| 5,702,839 | A | 12/1997 | Frost et al. |
| 5,795,669 | A | 8/1998 | Wilkinson et al. |
| 5,840,438 | A | 11/1998 | Johnson et al. |
| 5,871,860 | A | 2/1999 | Frost et al. |
| 5,879,827 | A | 3/1999 | Debe et al. |
| 6,136,412 | A * | 10/2000 | Spiewak et al. ............. 428/143 |
| 6,159,533 | A | 12/2000 | Dearnaley et al. |
| 6,183,668 | B1 | 2/2001 | Debe et al. |
| 6,238,534 | B1 | 5/2001 | Mao et al. |
| 7,790,304 | B2 | 9/2010 | Hendricks et al. |
| 2002/0192548 | A1 | 12/2002 | Schaefer et al. |
| 2004/0191601 | A1 | 9/2004 | Grot |
| 2005/0069755 | A1 | 3/2005 | Vernstrom et al. |
| 2005/0142433 | A1 | 6/2005 | Ueda et al. |

FOREIGN PATENT DOCUMENTS

| | | |
|---|---|---|
| EP | 1381102 A2 * | 1/2004 |
| GB | 2316802 | 3/1998 |
| JP | 63143752 | 6/1988 |
| JP | 2003168443 | 6/2003 |
| JP | 2005-032514 | 2/2005 |
| WO | WO 99/40237 | 8/1999 |
| WO | WO 00/52775 | 9/2000 |
| WO | WO 00/70700 | 11/2000 |
| WO | WO 2004/034501 | 4/2004 |
| WO | WO 2005/062408 | 7/2005 |
| WO | WO-2007/032903 A3 * | 3/2007 |

OTHER PUBLICATIONS

Debe, "Effect of Gravity on Copper Phthalocyanine Thin Films, III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboximide Derivative: Microstructure Versus Deposition Parameters", J. Vac. Sci. Technol. A, 6, (3), May/Jun. 1988, pp. 1907-1911.

Gasteiger, "Activity Benchmarks and Requirements for Pt, Pt-alloy, and non-Pt Oxygen Reduction Catalysts for PEMFCs", Applied Catalysts B: Environmental, vol. 56, 2005, pp. 9-35.

Kam, "Summary Abstract: Dramatic Variation of the Physical Microstructure of a Vapor Deposited Organic Thin Film", J. Vac. Sci. Technol, A, 5(4), Jul./Aug. 1987, pp. 1914-1916.

Lee, "Measurement and Modeling of the Reflectance-Reducing Properties of Gradient Index Microstructured Surfaces", Photo. Sci, and Eng., vol. 24, (4), Jul./Aug. 1980, pp. 211-216.

Ohnuma, "Amorphous Ultrafine Metallic Particles Prepared by Sputtering Method", Rapidly Quenched Metals, Proc. of the Fifth Int. Conf. on Rapidly Quenched Metals, Wurzburg, Germany, Sep. 3-7, 1984, S. Steeb et al., eds., Elsevier Science Publisher B.V., New York, 1985, pp. 1117-1124.

Sadaoka, Effects of Morphology on $NO_2$ Detection in Air At Room Temperature With Phthalocyanine Thin Films, J. Mat. Sci., 25, 1990, pp. 5257-5268.

Tang, High Dispersion ASnd Electrocatalytic Properties of Platinum on Well-Aligned Carbon Nanotube Arrays:, Carbon 42, 2004, pp. 191-197.

Wilkinson, "In-Plane Gradients in Fuel Cell Structure and Conditions for Higher Performance", Journal of Power Sources, 113, 2003, pp. 101-108.

Written Opinion of the International Searching Authority and International Search Report for PCT/US2006/033693, 16 pages.

* cited by examiner

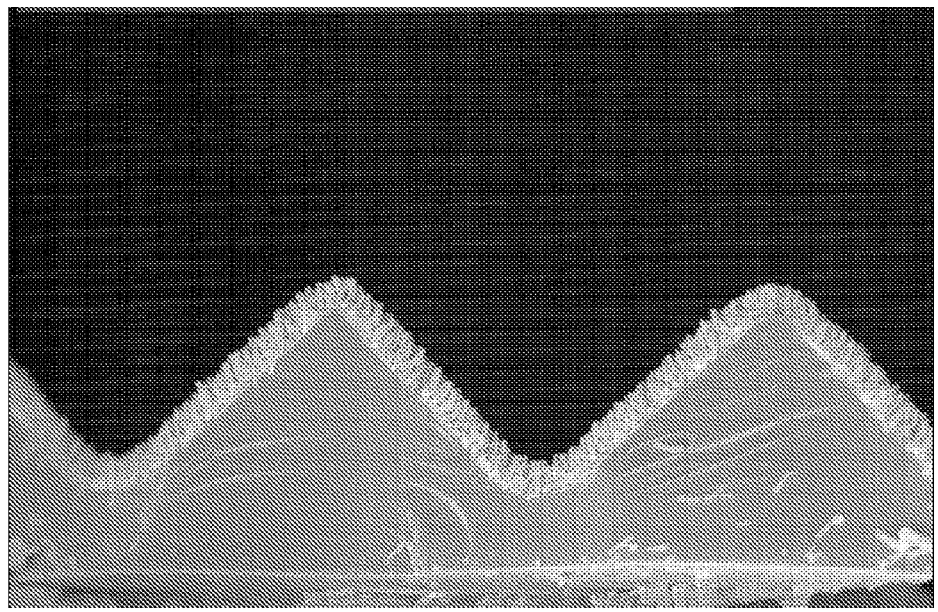
*Figure 6A*  6.00 μm
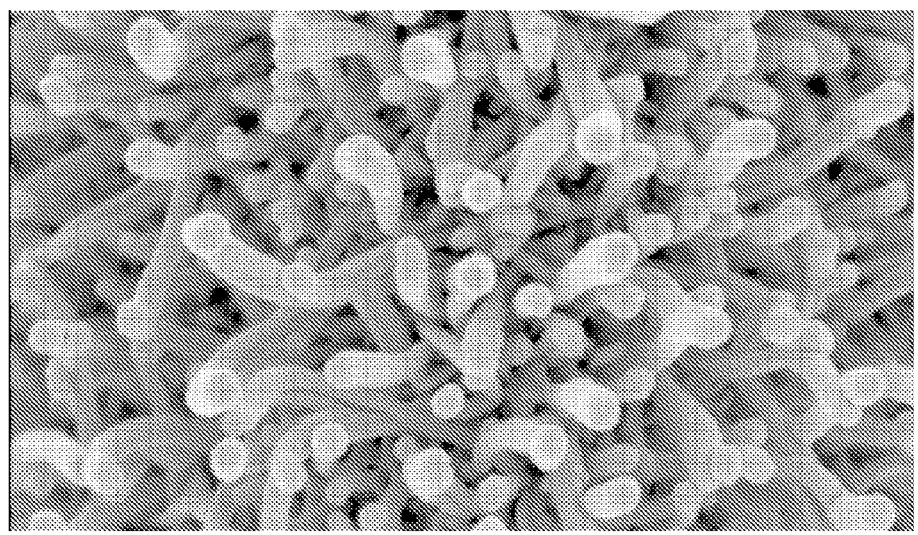
*Figure 6B*  6.00 nm o Pt on Cathode PtNiFe on Anode
★ PtNiFe on Cathode Pt on Anode

CATALYST LAYERS TO ENHANCE UNIFORMITY OF CURRENT DENSITY IN MEMBRANE ELECTRODE ASSEMBLIES

CROSS REFERENCE TO RELATED APPLICATIONS

This application is a divisional of U.S. Ser. No. 11/224,890, filed Sep. 13, 2005, now U.S. Pat. No. 7,790,304 B2(Hendricks et al.), the disclosure of which is incorporated by reference in its entirety herein.

FIELD OF THE INVENTION

The present invention relates generally to membrane electrode assemblies having catalyst layers with enhanced current density uniformity and methods of making such catalyst layers.

BACKGROUND OF THE INVENTION

Electrochemical devices, such as proton exchange membrane fuel cells, sensors, electrolyzers, chlor-alkali separation membranes, and the like, have been constructed from membrane electrode assemblies (MEAs). An MEA used in a typical electrochemical cell, for example, includes an ion conductive membrane (ICM) that is in contact with an anode and a cathode. The anode/membrane/cathode structure is sandwiched between two microporous, electrically conductive elements called diffusion current collectors (DCCs) to form a five layer MEA. Ions formed at the anode are transported to the cathode, allowing current to flow in an external circuit connecting the electrodes.

The ICM typically comprises a polymeric electrolyte material, which may constitute its own structural support or may be contained in a porous structural membrane. Cation- or proton-transporting polymeric electrolyte materials may be salts of polymers containing anionic groups and are often partially or completely fluorinated.

Fuel cell MEAs have been constructed using catalyst electrodes in the form of applied dispersions of either Pt or carbon supported Pt catalysts. A catalyst form used for polymer electrolyte membranes is Pt or Pt alloys coated onto larger carbon particles by wet chemical methods, such as reduction of chloroplatnic acid. This form of catalyst is dispersed with ionomeric binders, solvents, and often polytetrafluoroethylene (PTFE) particles to form an ink, paste, or dispersion that is applied either to the membrane or the DCCs.

More recently, catalyst layers have been formed using nanostructured support elements bearing particles or nanostructured thin films (NSTF) of catalytic material. The nanostructured catalyst electrodes may be incorporated into very thin surface layers of the ICM forming a dense distribution of catalyst particles. The use of nanostructured thin film (NSTF) catalyst layers allows much higher catalyst utilization than catalyst layers formed by dispersion methods.

The present invention describes methods for making enhanced catalyst layers used for electrochemical devices and offers various advantages over the prior art.

SUMMARY OF THE INVENTION

The present invention is directed to articles and methods involving catalyst layers such as those used for membrane electrode assemblies. One embodiment of the invention involves a method for making catalyst coated polymer electrolyte membranes. A catalyst layer having a variable activity profile across the width of the catalyst layer is formed on a substrate. The catalyst layer is disposed on a polymer electrolyte membrane (PEM) to form an intermediate assembly. Pressure is applied to the intermediate assembly sufficient to bond the catalyst layer to the PEM. The substrate is removed to create a multiple-width catalyst coated membrane. The multiple-width catalyst coated membrane is cut along the length of the catalyst layer to form single-width catalyst coated membranes. The single-width catalyst coated membranes may be cut to form smaller catalyst coated membranes.

Forming the catalyst layer having the variable catalyst activity profile may be accomplished by forming a catalyst layer with a variable catalyst loading profile, forming a catalyst layer with a variable surface area of a catalyst coating, and/or forming a catalyst layer with a variable surface area of catalyst support elements. In some implementations, the catalyst layer is a nanostructured thin film catalyst layer comprising a catalyst material coating a layer of nanostructured support elements. The catalyst layer may be formed on a microtextured substrate. The catalyst layer may comprise a metal, such as platinum or a platinum alloy.

According to one aspect of the invention, each single-width catalyst coated membrane is associated with a higher catalyst activity at a first edge of the single-width catalyst coated membrane relative to a lower catalyst activity at a second edge of the single-width catalyst coated membrane. The catalyst coated membranes may be incorporated into a fuel cell having flow field with inlets and outlets so that the first edge is proximate the flow field outlet and the second edge is proximate the flow field inlet. In this configuration the higher catalyst activity at the first edge of the single-width catalyst coated membrane relative to the lower catalyst loading at the second edge of the single-width catalyst coated membrane provides a substantially uniform current density along the single-width catalyst coated membrane during operation of the fuel cell.

According to another aspect of the invention, at least one of the catalyst layers formed on the substrate, the intermediate assembly, and the single-width catalyst coated membrane is formed as a roll good. First and second diffusion current collectors may be disposed adjacent opposite sides of the single-width catalyst coated membrane to form a membrane electrode assembly.

The variable catalyst activity profile of the catalyst layer may have a varying slope across the width of the catalyst layer. In one implementation, the variable catalyst activity profile may have substantially zero slope along a cutting line of the multiple-width catalyst coated membrane. For example, the variable catalyst activity profile may have a positive slope on one side of the cutting line and a negative slope on another side of the cutting line. The variable catalyst activity profile may be associated with a first catalyst activity along the cutting line and a second catalyst activity at edges along the length of the catalyst layer.

Another embodiment of the invention involves a method of making catalyst layers for membrane electrode assemblies. A multiple-width base catalyst layer having a variable catalyst loading profile along a width of the base catalyst layer is formed. The base catalyst layer is cut along a length of the base catalyst layer to form multiple catalyst layers.

The base catalyst layer may have a catalyst loading profile substantially symmetrical to a line of symmetry running along the length of the catalyst layer. The base catalyst layer is cut along the line of symmetry. For example, the variable catalyst loading profile may have a varying slope and/or may be non linear. In one implementation, the base catalyst layer may be formed on a substrate and then transferred to a polymer electrolyte membrane to form a catalyst coated membrane. In another implementation, the catalyst layer may be formed on a diffusion current collector to form a catalyst coated electrode backing.

Another embodiment of the invention is directed to an article including a catalyst layer having a width and a longitudinal axis. The catalyst layer has a catalyst activity profile with a varying slope across the width of the catalyst layer. The catalyst activity profile may be substantially symmetrical with respect to the longitudinal axis. In various implementations, the catalyst layer may have a catalyst activity profile having substantially zero slope at the longitudinal axis of the catalyst layer. In another implementation, the catalyst layer may have an activity profile with a variable positive slope on one side of the longitudinal axis and/or a variable negative slope on another side of the longitudinal axis. In yet another implementation, the catalyst layer may be associated with a first catalyst activity profile along the longitudinal axis and a second catalyst activity profile at edges running along a length of the catalyst layer.

The catalyst layer may comprise a nanostructured thin film catalyst layer and/or a dispersion coating. The catalyst layer may be formed on a microtextured substrate. The article may further include an electrically conductive microporous layer, wherein the catalyst layer is formed on the electrically conductive microporous layer.

Another embodiment of the invention is directed to a membrane electrode assembly comprising a nanostructured thin film catalyst having a substantially uniform catalyst activity profile and having at least one of a catalyst mass activity less than about 0.2 Amps/mg-Pt, a catalyst loading of less than about 0.2 mg/cm$^2$, and a mass specific area of less than about 50 m$^2$/g across the membrane electrode assembly from membrane electrode assembly inlet ports to membrane electrode assembly outlet ports.

According to one aspect to the embodiment, the catalyst mass activity is less than about 0.2 Amps/mg-Pt, the catalyst loading is greater than about 0.2 mg/cm$^2$, and the mass specific area is greater than about 50 m$^2$/g across the membrane electrode assembly from membrane electrode assembly inlet ports to membrane electrode assembly outlet ports.

According to another aspect of the embodiment, the catalyst mass activity is greater than about 0.2 Amps/mg-Pt, the catalyst loading is less than about 0.2 mg/cm$^2$, and the mass specific area is greater than about 50 m$^2$/g across the membrane electrode assembly from membrane electrode assembly inlet ports to membrane electrode assembly outlet ports.

According to yet another aspect of the embodiment, the catalyst loading is greater than about 0.2 mg/cm$^2$, and the mass specific area is less than about 50 m$^2$/g across the membrane electrode assembly from membrane electrode assembly inlet ports to membrane electrode assembly outlet ports.

Another embodiment of the invention involves a method for forming single width catalyst layers. A multiple-width base catalyst layer is formed as a roll good, and the base catalyst layer is cut along a length of the base catalyst layer to form multiple single-width catalyst layers. One or more of the single-width catalyst layers may be incorporated into an MEA of an electrochemical cell. The single-width catalyst layers have a catalyst activity profile that promotes uniform current density across the MEA during operation of the fuel cell. For example, the multiple-width catalyst layers may have a uniform or a variable catalyst activity profile.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 6A and 6B illustrate catalyst coated nanostructured support elements suitable for use in various embodiments of the inventions;

Figure 1:
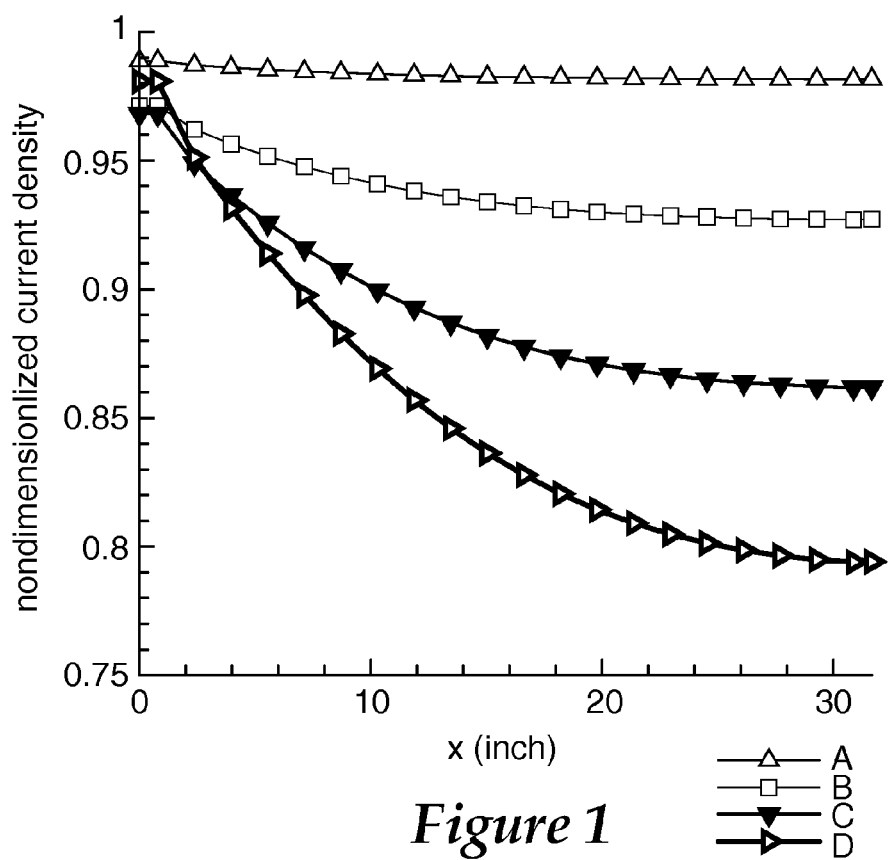
FIG. 1 illustrates graphs of calculated current density vs. down the channel position x.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to components that include catalyst layers used in membrane electrode assemblies (MEAs), and methods of making such components. Catalyst layers produced using the methods described herein yield more uniform current distributions across the active area of the MEA during operation. Some embodiments involve the formation of catalyst layers having a variable catalyst activity profile, for example, an activity profile with a varying slope, to compensate for the inherent non-uniformities of catalyst utilization during operation of an electrochemical fuel cell. Other embodiments use a uniform catalyst activity profile having a less active catalyst to achieve more uniform current density over the MEA active area.

Catalyst activity is dependent on several factors including, for example, the catalyst loading across the MEA from inlet to outlet ports and the catalyst mass activity. The catalyst mass activity is a function of the catalyst area specific activity and the catalyst mass specific area. A uniform catalyst activity profile of a less active catalyst or a variable catalyst activity profile may be achieved, for example, by controlling any or all of these factors. In some scenarios, the catalyst area specific activity and/or the mass specific area of the catalyst may be varied by varying the surface area of catalyst support elements.

The catalyst activity may be defined in terms of Amps/cm$^2$ of the planar area of the catalyst; catalyst mass activity may be defined in terms of Amps/mg of the catalyst, catalyst loading may be defined in terms of mg of catalyst per cm$^2$ of planar area of the catalyst; the catalyst area specific activity may be defined in terms of Amps per cm$^2$ of the effective catalyst surface area; and the mass specific area may be defined in terms of cm$^2$ of the effective catalyst surface area per mg of catalyst.

The catalyst activity profiles illustrated in the embodiments described herein advantageously provide better durability and lifetimes for MEAs, such as those used in proton exchange membrane (PEM) fuel cells. Better durability and lifetimes are achieved through the use of catalyst activity profiles that produce more uniform current distributions, which, in turn, produce more uniform temperature distributions across the surface of the MEA. The catalyst activity profiles described in the embodiments below allow for a gradient in activity from the reactant inlets to the outlets and/or a lower activity overall so as to better spread the current distribution over the entire MEA surface area.

Long-term durability and peak performance of a PEM fuel cell are both affected by the uniformity of the reaction rates over the MEA active area. The uniformity of the reaction rates directly determines the uniformity of overpotential in the electrode layer, and the uniformity of heat generation over the active area. The uniformity of the distribution of reaction rates depends on the uniformity of the reactants (oxygen on the cathode and hydrogen on the anode) over the MEA active area and on the uniformity of the local reactivity of the catalysts. The distribution of water supplied with the inlet gases, generated in the electrode at the catalyst surface, or trapped in the gas diffusion layer can also affect the uniformity of reactants and of the local reactivity of the catalysts. If the catalyst is flooded, then less oxygen can reach the catalyst. If the local membrane (or ionomer in the electrode layer, if a dispersed catalyst) is too dry, then the catalyst reactivity can be degraded. When there are non-uniformities in the local current density and heat generation and humidity, then some areas of the MEA will be hotter than others, a condition that may lead to premature failure. Even before failure, performance may not be optimized because some areas will have much more overpotential losses than others.

Achieving substantial uniformity of reaction rates is desirable for performance and durability. However, typical fuel cell MEA and flow field designs have built into them intrinsic non-uniformities. For example, typically the catalyst activity is made as high as possible, for example, by achieving the highest surface area possible, and then using a uniform distribution of catalyst over the active area. For a given total cell current, the cell will generate locally more current density near the inlets than further down the gas supply channels because doing so will minimize the overall cell overpotential (cell voltage loss). This effect is more severe the larger the catalyst activity. Since the local heat produced in the fuel cell is directly related to the current density, the more uniform the current density, the more uniform the temperature will be. Non-uniform temperatures and thus local relative humidity can lead to degraded performance and/or premature failure of an MEA.

Embodiments of the invention involve articles and methods for making articles that include catalyst layers capable of producing more uniform current densities across the active area of the MEA. For example, a more uniform current density may be achieved using an NSTF catalyst having a substantially uniform catalyst activity profile of a less active catalyst. Catalyst activity profiles that enhance current density uniformity may be achieved by controlling one or more of the catalyst mass activity, the catalyst loading, the catalyst area specific activity, and/or the catalyst mass specific area.

In one implementation, a substantially uniform catalyst activity profile producing more uniform current density may be achieved by limiting the catalyst mass activity at 900 mV under 100 kPa of oxygen and full saturation, $i_{m(0.9V)}$, to less than about 0.2 Amps/mg-Pt as measured using known test protocols, for example, the test protocol described in "Activity benchmarks and requirements for Pt, Pt-alloy, and non-Pt oxygen reduction catalysts for PEMFCs," Applied Catalysis B: Environmental 56 (2005) 9-35. In other implementations, a substantially uniform catalyst activity profile enhancing current density uniformity may be achieved by limiting the catalyst loading to less than about 0.2 mg/cm$^2$ and/or by limiting the mass specific area to less than about 50 m$^2$/g.

In other embodiments, a variable catalyst activity profile is used to counteract the intrinsic non-uniformities of a typical MEA flow field design. For example, a variable catalyst activity profile may be achieved by varying the catalyst loading across the MEA from inlet to outlet ports. Catalyst loading may be expressed as catalyst mass per MEA surface area, e.g., in mg of Pt per cm$^2$ of the MEA. In various implementations, a variable catalyst activity profile may be achieved by varying the loading, the catalyst area specific activity and/or the mass specific area of the catalyst.

FIG. 1 illustrates graphs of calculated current density vs. down the channel position x for samples having a range of ECSA (electrochemical surface area) values where sample A has the lowest ECSA and sample D has the highest ECSA. FIG. 1 illustrates both non-uniform current density with increased down the channel position and the effect of using a lower ECSA catalyst. As can be seen in FIG. 1, a more uniform current density may be achieved by using a lower ECSA catalyst. Sample A, which uses a catalyst having the lowest ECSA exhibits the most uniform current density of the group of samples.

As can be seen from FIG. 1, an electrochemical cell will generate more current density near the inlets than further down the gas supply channels. Catalyst layers having a non-uniform loading or activity distribution, including a varying the slope of loading or activity distribution, may be used to counteract the intrinsic non-uniformities of a typical MEA flow field design. In accordance with some embodiments, catalyst layers are formed that have a variable catalyst activity profile, such as the catalyst activity profiles illustrated in FIGS. 4A-J. The catalyst layers used for an MEA are prepared by forming a multiple-width catalyst layer having a varying slope catalyst activity profile and cutting the multiple-width layer into single widths. This technique takes advantage of the varying slope catalyst loading profiles that are typically produced with known thin film deposition methods, such as sputtering, although any catalyst activity profile may be achieved.

Figure 2:
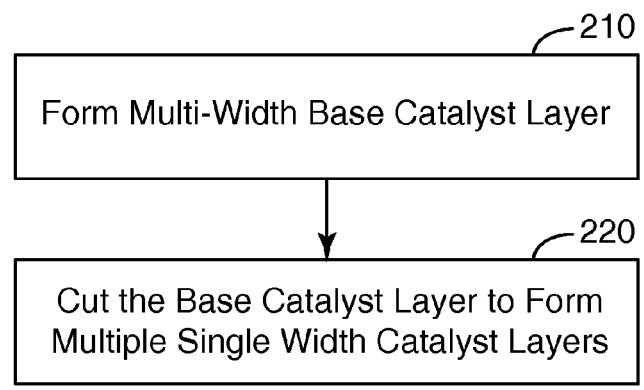
FIG. 2 is a flowchart illustrating a method of making a catalyst layer used to enhance current density uniformity in accordance with embodiments of the invention.
Figures 3A, 3B:
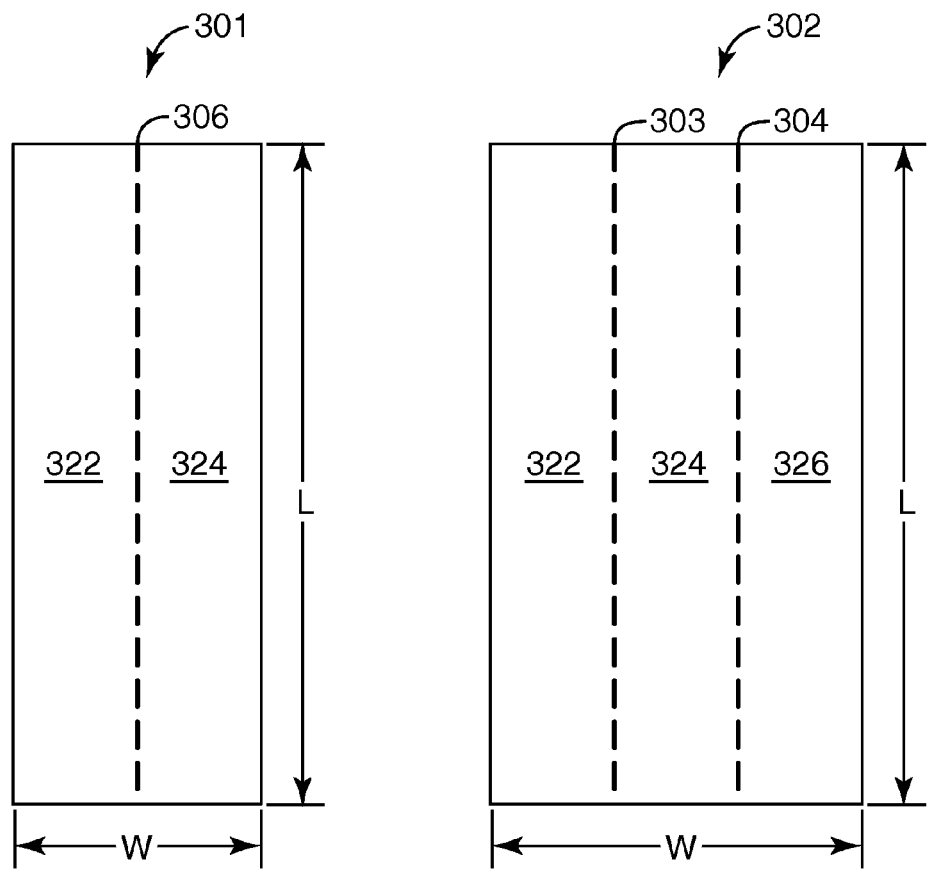
FIGS. 3A and 3B illustrate a multiple-width catalyst layer in accordance with embodiments of the invention.

A method of making a catalyst layer providing enhanced current density uniformity in accordance with embodiments of the invention is illustrated by the flowchart of FIG. 2. A multiple-width base catalyst layer, having a length and a width, is formed 210, for example, on a transfer substrate, diffusion current collector, or other structure. FIGS. 3A-B illustrate representative roll good base catalyst layers 301, 302, each having a catalyst activity profile across their widths (W). For example, in some embodiments, the roll good catalyst layers 301, 302 may have a uniform catalyst activity profile that produces reduced catalytic activity for more uniform current density as described above. In other embodiments, the catalyst layers 301, 302 may have variable catalyst activity profiles such as the catalyst activity profiles 410-419 illustrated in FIGS. 4A-J. The catalyst activity profiles illustrated in FIGS. 4A-J may be achieved by varying the catalyst loading across the MEA from inlet to outlet ports and/or by varying the catalyst area specific activity and/or by varying the mass specific area of the catalyst.

Formation of the catalyst layers may be accomplished using various deposition methods, including vacuum coating methods such as sputtering, evaporation, sublimation, CVD, arc, ion plating, or other methods. The catalyst layer so formed comprises a multiple-width catalyst layer that is cut 220 (FIG. 2) into two or more sections to form multiple single-width catalyst layers that may be incorporated into MEAs.

FIG. 3A illustrates a double width catalyst layer 301 that is cut along its length on cutting line 306 into two 322, 324 single-width catalyst layers. FIG. 3B illustrates a multiple-width catalyst layer 302 that is cut along its length at cutting lines, 303, 304 to form three single-width catalyst layers 332, 334, 336. FIGS. 4A-J illustrate a few representative catalyst activity profiles.

As will be appreciated by those skilled in the art, any catalyst activity profile may be used and the catalyst layer may be cut into any number of sections. The catalyst activity profile across the width of the multiple-width catalyst layer may be linear (not shown), piece-wise linear (illustrated by profiles 412, 416, and 419), or non-linear (illustrated by profiles 410, 411, 413, 414, 415, 417, 418). After cutting the multiple-width base catalyst layer into sections, the sections themselves may be cut along their widths or lengths to produce additional segments.

Figure 4A:
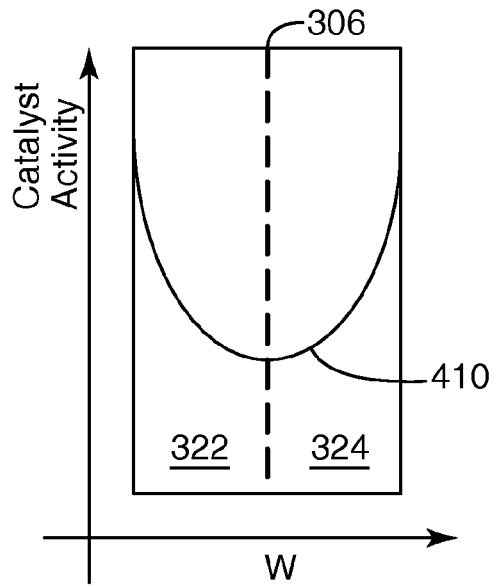
FIGS. 4A-4J illustrate exemplary catalyst activity or loading profiles in accordance with embodiments of the invention.
Figure 4B:
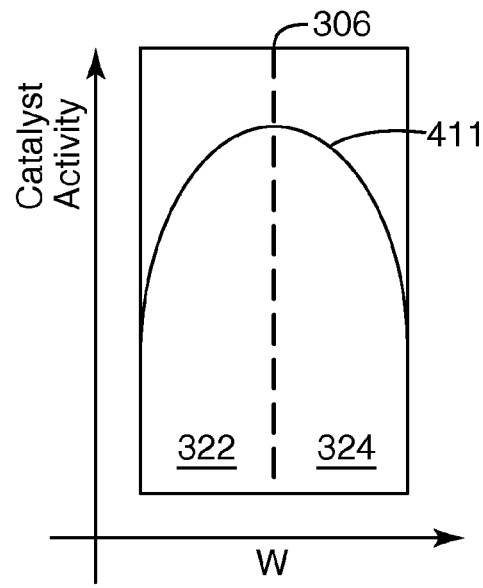
Figure 4C:
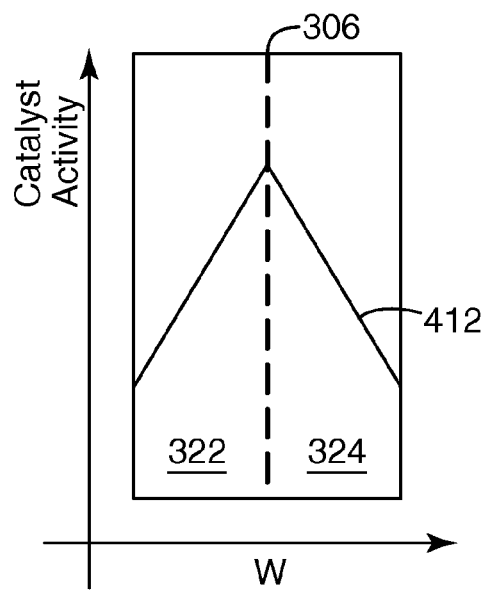
Figure 4D:
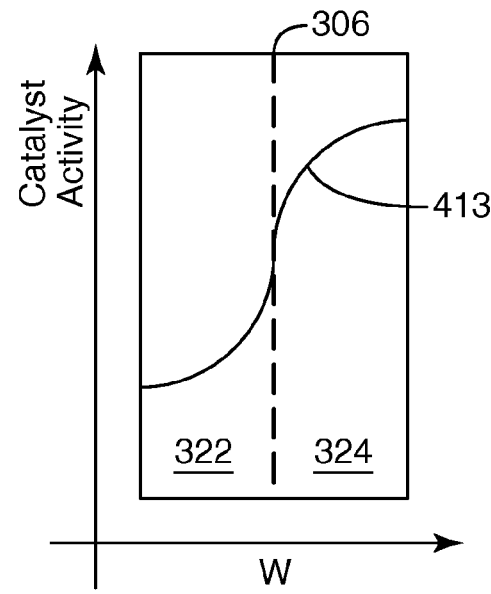
Figure 4E:
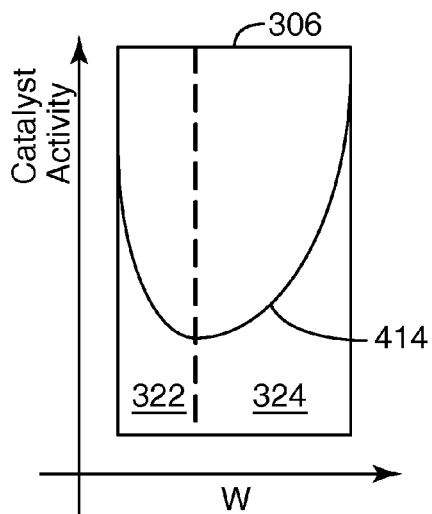
Figure 4F:
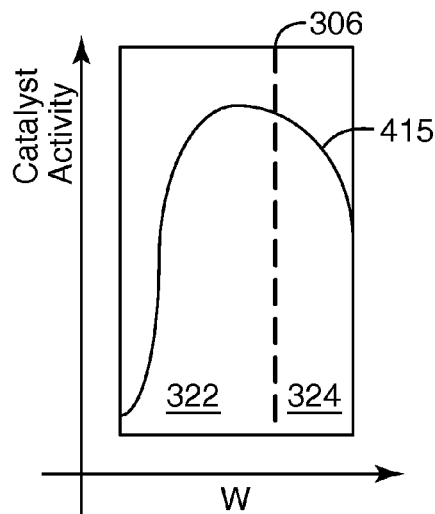
Figure 4G:
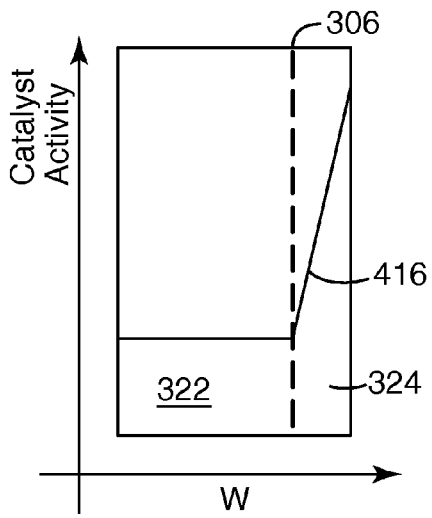
Figure 4H:
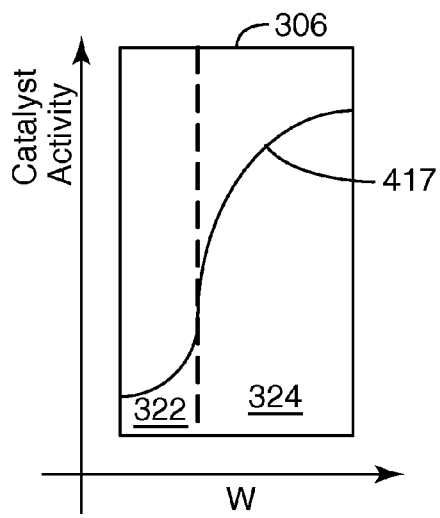
Figure 4I:
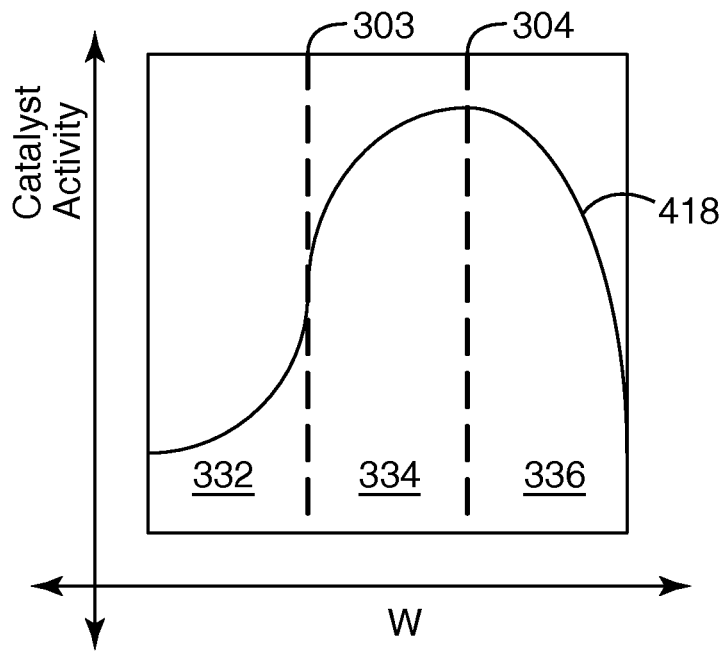
Figure 4J:
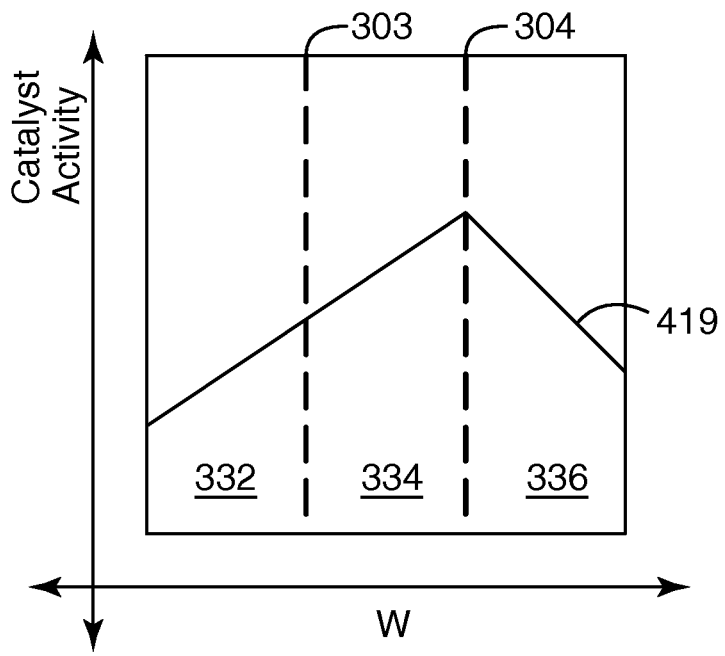

In some implementations, the catalyst activity profile may be symmetrical with respect to a cutting line. Symmetry with respect to a cutting line is exhibited by the catalyst activity profiles 410, 411, 412 of FIGS. 4A-4C. Catalyst activity profiles 410, 411, 412 are each symmetrical with respect to cutting line 306. Portions of the catalyst activity profiles 418 and 419 illustrated in FIGS. 4I and 4J are substantially symmetrical with respect to cutting line 304.

In some implementations, the catalyst activity profile may have maximum catalyst activity (zero slope) along a cutting line with a positive slope on one side of the cutting line and a negative slope on the other side of the cutting line. This implementation is illustrated by activity profiles 411, 412, 418, and 419 in FIGS. 4B, 4C, 4I, and 4J, respectively. Alternatively, the catalyst activity profile may have a minimum catalyst activity (zero slope) along a cutting line with a negative slope on one side of the cutting line and a positive slope on the other side of the cutting line. This implementation is illustrated by catalyst activity profile 410 in FIGS. 4A.

In various embodiments, after cutting a multiple-width catalyst layer, each resultant catalyst layer 322, 324, 332, 334, 336 may have a catalyst activity profile with a varying slope across the width of the resultant catalyst layer. This result is achieved by cutting catalyst layers having catalyst activity profiles 410, 411, 413, 414, 415, 417, 418, shown respectively in FIGS. 4A, 4B, 4E, 4F, 4H, and 4I along cutting lines 303, 304, and/or 306. In contrast, cutting catalyst activity profiles 412, 416, and 419, shown in FIGS. 4C, 4G, and 4J, respectively, results in catalyst layers 322, 324, 332, 334, 336 with constant slope catalyst activity profiles.

In some implementations the catalyst activity profiles across the multiple-width catalyst layers are substantially linear or piece-wise linear, such as profiles 412, 416, and 419. In some implementations, the catalyst activity profiles of the multiple-width catalyst layers are nonlinear, such as profiles 410, 411, 413, 414, 415, 417, and 418.

The catalyst layers resulting from the cutting operation may have a catalyst activity profile that is maximum at one edge and minimum at another edge. In some implementations, the maximum catalyst activity may be achieved by catalyst loading in a range from about 0.05 mg/cm$^2$ to about 0.4 mg/cm$^2$ and the minimum catalyst activity may be achieved by catalyst loading in a range from about 0.04 mg/cm$^2$ to about 0.2 mg/cm$^2$.

Figure 5:
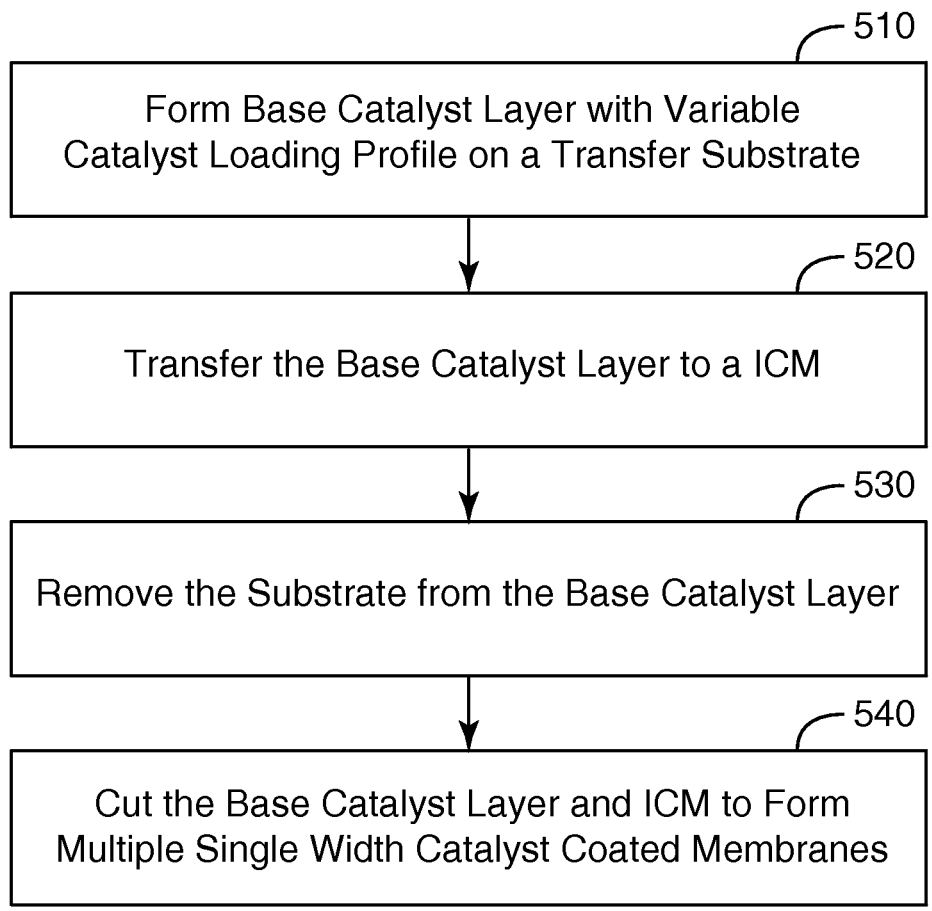
FIG. 5 is a flowchart illustrating a method of making multiple, single-width catalyst coated membrane layers in accordance with embodiments of the invention.

The flowchart of FIG. 5 illustrates a method of making a catalyst coated membrane in accordance with embodiments of the invention. A multiple-width base catalyst layer is formed 510 on a transfer substrate. The catalyst layer is transferred 520 to one or both surfaces of an ion conductive membrane (ICM). Transferring the catalyst layer to the surface of the ICM involves disposing the catalyst layer on the surface of the ICM to form an intermediate assembly. The catalyst layer is bonded to the ICM by applying pressure, and optionally heat, to the intermediate assembly. The transfer substrate is removed 530 in a delamination step leaving a multiple-width catalyst coated membrane. The multiple-width catalyst coated membrane is cut 540 along one or more cutting lines to form multiple single-width catalyst coated membranes (CCMs). In some embodiments, one or more of the catalyst layers formed on the substrate, the intermediate assembly, and the single-width catalyst coated membranes may be formed as a roll good.

In some embodiments, the base catalyst layer may be formed directly on a surface of a diffusion current collector (DCC) to form a catalyst coated electrode backing (CCEB). Alternatively, the base catalyst layer may be formed on a transfer substrate and then transferred to a surface of a DCC to form the CCEB in a manner similar to that described in connection with FIG. 5.

In some embodiments, the base catalyst layer may be formed by coating the transfer substrate, ICM, or DCC with a dispersed catalyst material. Typically, carbon-supported catalyst particles are used. For example, carbon-supported catalyst particles may be 50-90% carbon and 10-50% catalyst metal by weight, the catalyst metal typically comprising Pt for the cathode and Pt and Ru in a weight ratio of 2:1 for the anode for reformate fueled fuel cells. The catalyst is typically applied to the ICM or to the DCC in the form of a catalyst ink. The catalyst ink typically comprises polymer electrolyte material, which may or may not be the same material which comprises the ICM.

The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols, polyalcohols, such a glycerin and ethylene glycol, or other solvents such as N-methylpyrrolidone (NMP) and dimethylformamide (DMF). The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the transfer substrate, ICM or DCC by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

In some embodiments, the catalyst layer may comprise nanostructured thin films having support elements conformally coated with catalyst material. Nanostructured support elements suitable for use in various embodiments of the inventions are illustrated in FIGS. 6A and 6B. The support elements may have substantially uniform but not identical cross-sections, and high length-to-width ratios. For example, the nanostructured support elements may have an aspect ratio (i.e., a length to diameter ratio) greater than about 3:1. The support elements can have a variety of orientations and straight and curved shapes, (e.g., whiskers, rods, cones, pyramids, spheres, cylinders, laths, tubes and the like that can be twisted, curved, hollow or straight).

Methods for making nanostructured support elements are described in commonly owned U.S. Pat. Nos. 4,812352, 5,879,827, and 6,136,412 which are incorporated herein by reference. Methods for making organic nanostructured layers are disclosed in Materials Science and Engineering, A158 (1992), pp. 1-6; J. Vac. Sci. Technol. A, 5 (4), July/August, 1987, pp. 1914-16; J. Vac. Sci. Technol. A, 6, (3), May/August, 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. Nos. 4,568,598, 4,340,276, the disclosures of the patents are incorporated herein by reference. Properties of catalyst layers using carbon nanotube arrays are disclosed in "High Dispersion and Electrocatalytic Properties of Platinum on Well-Aligned Carbon Nanotube Arrays," Carbon 42 (2004) 191-197.

Nanostructured support elements suitable for use in the present invention may comprise whiskers of organic pigment, such as C.I. PIGMENT RED 149 (perylene red). As previously discussed, in some embodiments, a nanostructured catalyst layer is formed on a transfer substrate and then transferred to an ion conductive membrane or diffusion current collector to form a catalyst coated membrane or catalyst coated electrode backing, respectively.

Materials useful as a substrate include those which maintain their integrity at the temperature and vacuum imposed upon them during the vapor deposition and annealing steps. The substrate can be flexible or rigid, planar or non-planar, convex, concave, textured, or combinations thereof.

Preferred substrate materials include organic materials and inorganic materials (including, for example, glasses, ceramics, metals, and semiconductors). Preferred inorganic substrate materials are glass or metal. A preferred organic substrate material is a polyimide. More preferably, the substrate, if non-metallic, is metallized with a 10-70 nm thick layer of an electrically conductive metal for removal of static charge or provide useful optical properties. The layer may be discontinuous.

Representative organic substrates include those that are stable at the annealing temperature, for example, polymers such as polyimide film (commercially available, for example, under the trade designation "KAPTON" from DuPont Electronics, Wilmington, Del.), high temperature stable polyimides, polyesters, polyamids, and polyaramids.

Metals useful as substrates include, for example, aluminum, cobalt, chrome, molybdenum, nickel, platinum, tantalum, or combinations thereof. Ceramics useful as a substrate material include, for example, metal or non-metal oxides such as alumina and silica. A useful inorganic nonmetal is silicon.

The organic material from which the nanostructures can be formed may be coated onto the substrate using techniques known in the art for applying a layer of an organic material onto a substrate, including, for example, vapor phase deposition (e.g., vacuum evaporation, sublimation, and chemical vapor deposition), and solution coating or dispersion coating (e.g., dip coating, spray coating, spin coating, blade or knife coating, bar coating, roll coating, and pour coating (i.e., pouring a liquid onto a surface and allowing the liquid to flow over the surface)). Preferably, the organic layer is applied by physical vacuum vapor deposition (i.e., sublimation of the organic material under an applied vacuum).

Useful organic materials for producing nanostructures by, for example, coating followed by plasma etching, can include for example, polymers and prepolymers thereof (e.g., thermoplastic polymers such as, for example, alkyds, melamines, urea formaldehydes, diallyl phthalates, epoxies, phenolics, polyesters, and silicones; thermoset polymers, such as acrylonitrile-butadiene-styrenes, acetals, acrylics, cellulosics, chlorinated polyethers, ethylene-vinyl acetates, fluorocarbons, ionomers, nylons, parylenes, phenoxies, polyallomers, polyethylenes, polypropylenes, polyamide-imides, polyimides, polycarbonates, polyesters, polyphenylene oxides, polystyrenes, polysulfones, and vinyls); and organometallics (e.g., bis($\eta^5$-cyclopentadienyl)iron (II), iron pentacarbonyl, ruthenium pentacarbonyl, osmium pentacarbonyl, chromium hexacarbonyl, molybdenum hexacarbonyl, tungsten hexacarbonyl, and tris(triphenylphosphine) rhodium chloride).

Preferably, the chemical composition of the organic-based nanostructured layer will be the same as that of the starting organic material. Preferred organic materials useful in preparing the nanostructured layer include, for example, planar molecules comprising chains or rings over which π-electron density is extensively delocalized. These organic materials generally crystallize in a herringbone configuration. Preferred organic materials can be broadly classified as polynuclear aromatic hydrocarbons and heterocyclic aromatic compounds.

Preferred polynuclear aromatic hydrocarbons, which are commercially available, include, for example, naphthalenes, phenanthrenes, perylenes, anthracenes, coronenes, and pyrenes. A preferred polynuclear aromatic hydrocarbon is N,N'-di(3,5-xylyl)perylene-3,4,9,10 bis(dicarboximide) commercially available under the trade designation "C. I. PIGMENT RED 149" herein designated "perylene red."

Preferred heterocyclic aromatic compounds, which are commercially available, include, for example, phthalocyanines, porphyrins, carbazoles, purines, and pterins. Representative examples of heterocyclic aromatic compounds include, for example, metal-free phthalocyanine (e.g., dihydrogen phthalocyanine) and its metal complexes (e.g. copper phthalocyanine).

The organic materials preferably are capable of forming a continuous layer when deposited onto a substrate. Preferably, the thickness of this continuous layer is in the range from 1 nanometer to about one thousand nanometers.

Orientation of the nanostructured elements can be affected by the substrate temperature, the deposition rate, and angle of incidence during deposition of the organic layer. If the temperature of the substrate during deposition of the organic material is sufficiently high (i.e., above a critical substrate temperature which has been associated in the art with a value one-third the boiling point, in degrees Kelvin, of the organic material), the deposited organic material will form randomly oriented nanostructures either as deposited or when subsequently annealed. If the temperature of the substrate during deposition is relatively low (i.e., below the critical substrate temperature), the deposited organic material tends to form uniformly oriented nanostructures when annealed. For example, if uniformly oriented nanostructures comprising perylene red are desired, the temperature of the substrate during the deposition of the perylene red is preferably about 0° C. to about 30° C. Certain subsequent conformal coating processes, such as DC magnetron sputtering and cathodic arc vacuum processes, can produce curvilinear nanostructures.

There can be an optimum maximum annealing temperature for different film thicknesses in order to fully convert the deposited layer to nanostructures. When fully converted, the major dimension of each nanostructured support element is directly proportional to the thickness of the initially deposited organic layer. Since the nanostructures are discrete, are separated by distances on the order of their cross-sectional dimensions, and have substantially uniform cross-sectional dimensions, and all the original organic film material is converted to nanostructures, conservation of mass implies that the lengths of the nanostructures will be proportional to the thickness of the layer initially deposited. Due to this relationship of the original organic layer thickness to the lengths of the nanostructures, and the independence of cross-sectional dimensions from length, the lengths and aspect ratios of the nanostructures can be varied independently of their cross-sectional dimensions and areal densities. For example, it has been found that the length of nanostructures are approximately 10-15 times the thickness of the vapor deposited perylene red layer, when the thickness ranges from about 0.05 to about 0.2 micrometer. The surface area of the nanostructured layer (i.e., the sum of the surface areas of the individual nanostructures) is much greater than that of the organic layer initially deposited on the substrate. Preferably, thickness of the initially deposited layer is in the range from about 0.03 to about 0.5 micrometer.

Each individual nanostructured support element can be monocrystalline, polycrystalline, or amorphous. The nanostructured layer can have highly anisotropic properties due to the crystalline nature and uniform orientation of the nanostructures. The nanostructured support elements may have a vertical dimension that ranges, for example, from about 0.6 µm to about 2 µm and a horizontal dimension that ranges from about 0.025 µm to about 0.06 µm.

If a discontinuous distribution of nanostructures is desired, masks may be used in the organic layer deposition step to selectively coat specific areas or regions of the substrate. Other techniques known in the art for selectively depositing an organic layer on specific areas or regions of a substrate may also be useful.

In the annealing step, the substrate having an organic layer coated thereon is heated in a vacuum for a time and at a temperature sufficient for the coated organic layer to undergo a physical change, wherein the organic layer grows to form a nanostructured layer comprising a dense array of discrete, oriented monocrystalline or polycrystalline nanostructures. Uniform orientation of the nanostructures is an inherent consequence of the annealing process when the substrate temperature during deposition is sufficiently low. Exposure of the coated substrate to the atmosphere prior to the annealing step is not observed to be detrimental to subsequent nanostructure formation.

If, for example, the coated organic material is perylene red or copper phthalocyanine, annealing is preferably done in a vacuum (i.e., less than about $1 \times 10^{-3}$ Torr) at a temperature in the range from about 160° C. to about 270° C. The annealing time necessary to convert the original organic layer to the nanostructured layer is dependent on the annealing temperature. Typically, an annealing time in the range from about 10 minutes to about 6 hours is sufficient. Preferably the annealing time is in the range from about 20 minutes to about 4 hours. Further, for perylene red, the optimum annealing temperature to convert all of the original organic layer to a nanostructured layer, but not sublime it away, is observed to vary with the deposited layer thickness. Typically, for original organic layer thicknesses of 0.05 to 0.15 micrometer, the temperature is in the range of 245° C. to 270° C.

The time interval between the vapor deposition step and the annealing step can vary from several minutes to several months, with no significant adverse effect, provided the coated composite is stored in a covered container to minimize contamination (e.g., dust). As the nanostructures grow, the organic infrared band intensities change and the laser specular reflectivity drops, allowing the conversion to be carefully monitored, for example, in situ by surface infrared spectroscopy. After the nanostructures have grown to the desired dimensions, the resulting layered structure, which comprises the substrate and the nanostructures, is allowed to cool before being brought to atmospheric pressure.

If a patterned distribution of nanostructures is desired, nanostructures may be selectively removed from the substrate, for example, by mechanical means, vacuum process means, chemical means, gas pressure or fluid means, radiation means, and combinations thereof. Useful mechanical means include, for example, scraping nanostructures off the substrate with a sharp instrument (e.g., with a razor blade), and encapsulating with a polymer followed by delamination. Useful radiation means include laser or light ablation. Such ablation can result in a patterned electrode. Useful chemical means include, for example, acid etching selected areas or regions of the nanostructured layer. Useful vacuum means include, for example, ion sputtering and reactive ion etching. Useful air pressure means include, for example, blowing the nanostructures off the substrate with a gas (e.g., air) or fluid stream. Combinations of the above are also possible, such as use of photoresists and photolithography.

The nanostructures can be extensions of the substrate and of the same material as the substrate by, e.g., vapor depositing a discontinuous metal microisland mask onto the surface of a polymer, then plasma or reactive ion etching away the polymer material not masked by the metal microislands, to leave polymer substrate posts protruding from the surface, so long as they are transferable to the ICM.

Useful inorganic materials for producing nanostructures include, for example, carbon, diamond-like carbon, carbon nanotubes, ceramics (e.g., metal or non-metal oxides such as alumina, silica, iron oxide, and copper oxide; metal or non-metal nitrides such as silicon nitride and titanium nitride; and metal or non-metal carbides such as silicon carbide; metal or non-metal borides such as titanium boride); metal or non-metal sulfides such as cadmium sulfide and zinc sulfide; metal silicides such as magnesium silicide, calcium silicide, and iron silicide; metals (e.g., noble metals such as gold, silver, platinum, osmium, iridium, palladium, ruthenium, rhodium, and combinations thereof; transition metals such as scandium, vanadium, chromium, manganese, cobalt, nickel, copper, zirconium, and combinations thereof, low melting metals such as bismuth, lead, indium, antimony, tin, zinc, and aluminum; refractory metals such as tungsten, rhenium, tantalum, molybdenum, and combinations thereof); and semiconductor materials (e.g., diamond, germanium, selenium, arsenic, silicon, tellurium, gallium arsenide, gallium antimonide, gallium phosphide, aluminum antimonide, indium antimonide, indium tin oxide, zinc antimonide, indium phosphide, aluminum gallium arsenide, zinc telluride, and combinations thereof).

Preferably, one or more layers of material that conformally coats the nanostructures serve as a functional layer imparting desirable catalytic properties, and may also impart electrical conductivity and mechanical properties (e.g., strengthens and/or protects the nanostructures comprising the nanostructured layer), and low vapor pressure properties.

The conformal coating material preferably can be an inorganic material or it can be an organic material including a polymeric material. Useful inorganic conformal coating materials include, for example, those described above in the description of the nanostructures. Useful organic materials include, for example, conductive polymers (e.g., polyacetylene), polymers derived from poly-p-xylylene, and materials capable of forming self-assembled layers.

The preferred thickness of the conformal coating is typically in the range from about 0.2 to about 50 nm. The conformal coating may be deposited onto the nanostructured layer using conventional techniques, including, for example, those disclosed in U.S. Pat. Nos. 4,812,352 and 5,039,561, the disclosures of which are incorporated herein by reference. Any method that avoids disturbance of the nanostructured layer by mechanical forces can be used to deposit the conformal coating. Suitable methods include, for example, vapor phase deposition (e.g., vacuum evaporation, sputter coating, and chemical vapor deposition) solution coating or dispersion coating (e.g., dip coating, spray coating, spin coating, pour coating (i.e., pouring a liquid over a surface and allowing the liquid to flow over the nanostructured layer, followed by solvent removal)), immersion coating (i.e., immersing the nanostructured layer in a solution for a time sufficient to allow the layer to adsorb molecules from the solution, or colloidals or other particles from a dispersion), electroplating and electroless plating. More preferably, the conformal coating is deposited by vapor phase deposition methods, such as, for example, ion sputter deposition, cathodic arc deposition, vapor condensation, vacuum sublimation, physical vapor transport, chemical vapor transport, metalorganic chemical vapor deposition, and ion beam assisted deposition. Preferably, the conformal coating material is a catalytic metal or metal alloy.

For the deposition of a patterned conformal coating, the deposition techniques are modified by means known in the art to produce such discontinuous coatings. Known modifications include, for example, use of masks, shutters, directed ion beams, and deposition source beams.

In some applications, key aspects of the formed acicular nanostructures support elements is that they be easily transferable from the initial substrate into the membrane to form the MEA catalyst electrode layer; they allow a higher weight percent loading of catalyst coating on the nanostructured support element, preferably at least an 80 wt % ratio of catalyst particles to the combined weight of the nanostructured support element and catalyst coating; they have sufficient number density and aspect ratio to provide a high value of surface area support for the catalyst, at least 10 to 15 times the planar area of the substrate; and the shape and orientation of the acicular support particles on the initial substrate are conducive to uniform coating with catalyst.

Important aspects of the catalyst deposition methods for thin film catalyst deposition are that the deposition results in the formation of thin catalyst films comprising polycrystalline particles with particle sizes in the several tens of nanometers range, preferably the 2-50 nm range, which uniformly coat at least a portion of the outer surface area of the nanostructured support elements.

In general, the catalyst is deposited on the nanostructured support elements at nucleation sites which grow into catalyst particles. It has been discovered that the size of the resultant catalyst particle is a function of the initial size of the support element and the amount of catalyst loading. For the same catalyst loading, in $mg/cm^2$, longer catalyst supports will result in thinner catalyst films and smaller catalyst particle sizes, compared to shorter catalyst supports of the same cross-sectional dimensions.

Catalyst utilization can be increased by the use of thinner catalyst films and smaller catalyst particles in lower loadings of catalyst onto shorter nanostructure supports. Catalyst utilization can be further increased by localizing those catalyst particles in a thinner surface layer which is partially non-embedded in the ICM. These goals can be achieved simultaneously by making shorter nanostructure supports, coating them with a lower loading of catalyst, and applying the nanostructured elements to an ICM such that they are broken and fragmented during the application step to form a thin partially embedded layer.

The ion conductive membrane (ICM) may be composed of any suitable ion exchange electrolyte. The electrolytes are preferably solids or gels. Electrolytes useful in the present invention can include ionic conductive materials, such as polymer electrolytes, and ion-exchange resins. The electrolytes are preferably proton conducting ionomers suitable for use in proton exchange membrane fuel cells.

Copolymers of tetrafluoroethylene (TFE) and a co-monomer according to the formula: $FSO_2$—$CF_2$—$CF_2$—O—$CF(CF_3)$—$CF_2$—O—CF=$CF_2$ are known and sold in sulfonic acid form, i.e., with the $FSO_2$— end group hydrolyzed to $HSO_3$—, under the trade name NAFION® by DuPont Chemical Company, Wilmington, Del. NAFION® is commonly used in making polymer electrolyte membranes for use in fuel cells. Copolymers of tetrafluoroethylene (TFE) and a co-monomer according to the formula: $FSO_2$—$CF_2$—$CF_2$—O—CF=$CF_2$ are also known and used in sulfonic acid form, i.e., with the $FSO_2$— end group hydrolyzed to $HSO_3$—, in making polymer electrolyte membranes for use in fuel cells. Most preferred are copolymers of tetrafluoroethylene (TFE) and $FSO_2$—$CF_2CF_2CF_2CF_2$—O—CF=$CF_2$, with the $FSO_2$— end group hydrolyzed to $HSO_3$—.

Ionic conductive materials useful in the invention can be complexes of an alkalai metal or alkalai earth metal salt or a protonic acid with one or more polar polymers such as a polyether, polyester, or polyimide, or complexes of an alkalai metal or alkalai earth metal salt or a protonic acid with a network or crosslinked polymer containing the above polar polymer as a segment. Useful polyethers include: polyoxyalkylenes, such as polyethylene glycol, polyethylene glycol monoether, polyethylene glycol diether, polypropylene glycol, polypropylene glycol monoether, and polypropylene glycol diether; copolymers of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; esters, such as phosphoric acid esters, aliphatic carboxylic acid esters or aromatic carboxylic acid esters of the above polyoxyalkylenes. Copolymers of, e.g., polyethylene glycol with dialky siloxanes, polyethylene glycol with maleic anhydride, or polyethylene glycol monoethyl ether with methacrylic acid are known in the art to exhibit sufficient ionic conductivity to be useful in an ICM of the invention.

Useful complex-forming reagents can include alkalai metal salts, alkalai metal earth salts, and protonic acids and protonic acid salts. Counterions useful in the above salts can be halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like.

Ion-exchange resins useful as electrolytes in the present invention include hydrocarbon- and fluorocarbon-type resins. Hydrocarbon-type ion-exchange resins can include phenolic or sulfonic acid-type resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases, and can be preferable for composite electrolyte membranes useful in the invention. One family of fluorocarbon-type resins having sulfonic acid group functionality is the NAFION® resins.

Other fluorocarbon-type ion-exchange resins that can be useful in the invention comprise (co)polymers of olefins containing aryl perfluoroalkyl sulfonylimide cation-exchange groups, having the general formula (I): $CH_2=CH-Ar-SO_2-N-SO_2(C_1+n F_3+2n)$, wherein n is 0-11, preferably 0-3, and most preferably 0, and wherein Ar is any substituted or unsubstituted divalent aryl group, preferably monocyclic and most preferably a divalent phenyl group, referred to as phenyl herein. Ar may include any substituted or unsubstituted aromatic moieties, including benzene, naphthalene, anthracene, phenanthrene, indene, fluorene, cyclopetadiene and pyrene, wherein the moieties are preferably molecular weight 400 or less and more preferably 100 or less. Ar may be substituted with any group as defined herein. One such resin is p-STSI, an ion conductive material derived from free radical polymerization of styrenyl trifluoromethyl sulfonylimide (STSI) having the formula (II): styrenyl-$SO_2N^-$—$SO_2 CF_3$.

ICM's may also be composite membranes, comprising a porous membrane material combined with any of the above-described electrolytes. Any suitable porous membrane may be used. Porous membranes useful as reinforcing membranes of the invention can be of any construction having sufficient porosity to allow at least one liquid solution of an electrolyte to be infused or imbibed thereinto and having sufficient strength to withstand operating conditions in an electrochemical cell. Preferably, porous membranes useful in the invention comprise a polymer that is inert to conditions in the cell, such as a polyolefin, or a halogenated, preferably fluorinated, poly(vinyl) resin. Expanded PTFE membranes may be used, such as Poreflon™, produced by Sumitomo Electric Industries, Inc., Tokyo, Japan, and Tetratex™ produced by Tetratec, Inc., Feasterville, Pa.

Porous membranes useful in the present invention may comprise microporous films prepared by thermally-induced phase separation (TIPS) methods, as described in, e.g., U.S. Pat. Nos. 4,539,256, 4,726,989, 4,867,881, 5,120,594 and 5,260,360, the teachings of which are incorporated herein by reference. TIPS films exhibit a multiplicity of spaced, randomly dispersed, equiaxed, nonuniform shaped particles of a thermoplastic polymer, optionally coated with a liquid that is immiscible with the polymer at the crystallization temperature of the polymer, preferably in the form of a film, membrane, or sheet material. Micropores defined by the particles preferably are of sufficient size to allow electrolyte to be incorporated therein.

Polymers suitable for preparing films by the TIPS process include thermoplastic polymers, thermosensitive polymers, and mixtures of these polymers, so long as the mixed polymers are compatible. Thermosensitive polymers such as ultrahigh molecular weight polyethylene (UHMWPE) cannot be melt-processed directly but can be melt-processed in the presence of a diluent that lowers the viscosity thereof sufficiently for melt processing.

Suitable polymers include, for example, crystallizable vinyl polymers, condensation polymers, and oxidation polymers. Representative crystallizable vinyl polymers include, for example, high- and low-density polyethylene, polypropylene, polybutadiene, polyacrylates such as poly(methyl methacrylate), fluorine-containing polymers such as poly(vinylidene fluoride), and the like. Useful condensation polymers include, for example, polyesters, such as poly(ethylene terephthalate) and poly(butylene terephthalate), polyamides, including many members of the Nylon™ family, polycarbonates, and polysulfones. Useful oxidation polymers include, for example, poly(phenylene oxide) and poly(ether ketone). Blends of polymers and copolymers may also be useful in the invention. Preferred polymers for use as reinforcing membranes of the invention include crystallizable polymers, such as polyolefins and fluorine-containing polymers, because of their resistance to hydrolysis and oxidation. Preferred polyolefins include high density polyethylene, polypropylene, ethylene-propylene copolymers, and poly(vinylidene fluoride).

Where used, the diffusion current collector (DCC) may be comprised of materials capable of collecting electrical current from the electrode while allowing reactant gasses to pass through. The DCCs provide porous access of gaseous reactants and water vapor to the catalyst and membrane, and also collect the electronic current generated in the catalyst layer for powering the external load. Diffusion current collectors include a microporous layer (MPL) and an electrode backing layer (EBL), where the MPL is disposed between the catalyst layer and the EBL.

The carbon fiber constructions of DCCs generally have coarse and porous surfaces, which exhibit low bonding adhesion with catalyst layers. To increase the bonding adhesion and/or to provide water management, the MPL is coated to the surface of EBL's. This smoothens the coarse and porous surfaces of EBL's, which provides good bonding adhesion with catalyst layers.

EBL's may each be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo. EBL's may also be treated to increase or impart hydrophobic properties. For example, EBL's may be treated with highly-fluorinated polymers, such as polytetrafluoroethylene (PTFE) and fluorinated ethylene propylene (FEP).

Nanostructured support elements, described herein, may be applied directly to the surface of the ICM but need not be embedded in their entirety. The nanostructured elements may be embedded only so far as necessary to create a firm attachment between the particles and the ICM. While as much as 99% of the volume of the nanostructured elements may be embedded within the ICM, preferably, no more than 95% of the volume of the nanostructured elements is contained within the ICM, and more preferably no more than 90%. Most preferably, at least half of the volume of the nanostructured elements is outside of the ICM. In some embodiments, each nanostructured element may lie partially within and partially outside the ICM. In other embodiments, a part of the entire population of nanostructured elements may lie within the ICM and a part without, with some particles embedded, others non-embedded, and others partially embedded.

The nanostructured elements can be partially embedded in the surface of the ICM in a single orientation or in random directions. In the former case the catalyst coated support particles can be oriented parallel to the surface of the ICM so that in principle only catalyst on one side of the support particles contacts the solid polymer electrolyte, or they can be oriented more or less perpendicular to the ICM surface and have a fraction of their length embedded in the ICM surface, or the catalyst coated acicular-shaped support particles can have any intermediate position or combination of positions. Furthermore, the nanostructured elements may be broken or crushed so as to both further reduce their size and allow further compaction of the electrode layer. Preferably ionomer coats the acicular support elements for good proton conduction but voids remain between the catalyst coated acicular support elements for good reactant access to the catalyst surface.

Processes suitable for applying the catalyst particles to the membrane to form the MEA include static pressing with heat and pressure, or for continuous roll production, laminating, nip rolling, or calendering, followed by delamination of the initial catalyst support film substrate from the ICM surface, leaving the catalyst particles embedded.

Nanostructured elements, supported on a substrate, can be transferred and attached to the ICM by applying mechanical pressure and optionally heat and subsequently removing the original substrate. Any suitable source of pressure may be employed. A hydraulic press may be employed. Preferably, pressure may be applied by one or a series of nip rollers. This process is also adaptable to a continuous process, using either a flat bed press in a repeating operation or rollers in a continuing operation. Shims, spacers, and other mechanical devices intermediate between the source of pressure and the particle substrate may be employed for uniform distribution of pressure. The electrode particles are preferably supported on a substrate which is applied to the ICM surface, such that the particles contact the membrane surface. In one embodiment, an ICM may be placed between two sheets of polyimide-supported nanostructured films of catalyst coated nanostructured elements which are placed against the ICM. Additional layers of uncoated polyimide and PTFE sheets are further layered on either side of the sandwich for uniform distribution of pressure, and finally a pair of stainless steel shims is placed outside of this assembly. The substrate is removed after pressing, leaving the electrode particles attached to the ICM. Alternately, the electrode particles may be applied directly to the ICM surface, free of any substrate and without inclusion of any additional ionomer, and then pressed into the surface.

The pressure, temperature and duration of pressing may be any combination sufficient to partially embed the nanostructured elements in the membrane. The precise conditions used depend in part on the nature of the nanostructured elements used.

In one embodiment, relatively short nanostructured supports coated with a lower loading of catalyst are applied to an ICM under pressure and heat such that they are broken and fragmented during the application step to form a thin partially embedded layer. Preferably, the resulting layer is less than about 2 micrometers thick; more preferably less than 1.0 micrometer, and most preferably less than 0.5 micrometer thick. Nanostructured elements useful in this method are preferably less than 1.0 micrometer in length and more preferably less than 0.6 micrometer in length, and the loading of catalyst for nanostructured elements useful in this method is less than 0.2 mg/cm$^2$ of the whisker substrate area, preferably less than 0.1 mg/cm$^2$. In this embodiment, a pressure of between 90 and 900 MPa is preferably used. Most preferably, a pressure of between 180 and 270 MPa is used. Preferably the press temperature is between 80° C. and 300° C., and most preferably between 100° C. and 150° C. The pressing time is preferably greater than 1 second and most preferably about one minute. After loading into the press, the MEA components may be allowed to equilibrate to the press temperature, at low or no pressure, prior to pressing. Alternately, the MEA components may be preheated in an oven or other apparatus adapted for the purpose. Preferably the MEA components are preheated for 1-10 minutes before pressing. The MEA may be cooled before or after removal from the press. The platens of the press may be water cooled or cooled by any other suitable means. Preferably, the MEA is cooled for 1-10 minutes while still under pressure in the press. The MEA is preferably cooled to under about 50° C. before removal from the press. A press employing vacuum platens may optionally be used.

In another embodiment, the MEA can be formed at room temperature and pressures of between 9 and 900 MPa by pretreatment of the ICM with the appropriate solvent. In contrast, the prior art requires elevated temperatures to obtain an intimate bond between the catalyst/ionomer layer and the ICM. By briefly exposing a perfluorosulfonic acid polymer membrane surface to a solvent, preferably heptane, that catalyst coated nanostructured support particles can be transferred to and partially embedded in the ICM from the support substrate, at room temperature.

In this embodiment, a pressure of between 9 and 900 MPa is preferably used. Most preferably, a pressure of between 45 and 180 MPa is used. Preferably the press temperature is room temperature, i.e. about 25° C., but may be anywhere between 0° and 50° C. The pressing time is preferably greater than 1 second and most preferably between 10 seconds and about one minute. Since the pressing occurs at room temperature, no preheating or post-press cool are required.

The ICM is pretreated by brief exposure to the solvent by any means, including immersion, contact with a saturated material, spraying, or condensation of vapor, but preferably by immersion. Excess solvent may be shaken off after the pretreatment. Any duration of exposure which does not compromise the ICM may be used, however, a duration of at least one second is preferred. The solvent used may be chosen from apolar solvents, heptane, isopropanol, methanol, acetone, IPA, $C_8F_{17}SO_3H$, octane, ethanol, THF, MEK, DMSO, cyclohexane, or cyclohexanone. Apolar solvents are preferred. Heptane is most preferred, as it is observed to have the optimum wetting and drying conditions and to allow complete transfer of the nanostructured catalysts to the ICM surface without causing the ICM to swell or distort. This pretreatment of the ICM may be used with any catalyst particles and is not limited to nanostructured elements, although they are the preferred catalyst particles.

Figure 7A:
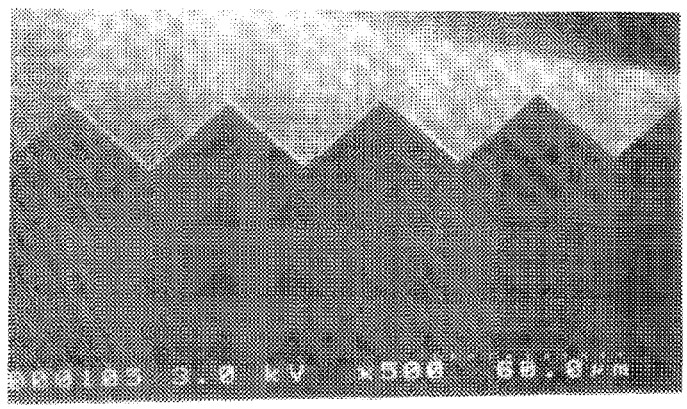
FIGS. 7A-7C are scanning electron micrographs of a cross section of an MEA surface where the nanostructured electrode layer conforms to a microtextured shape in accordance with embodiments of the invention.
Figure 7B:
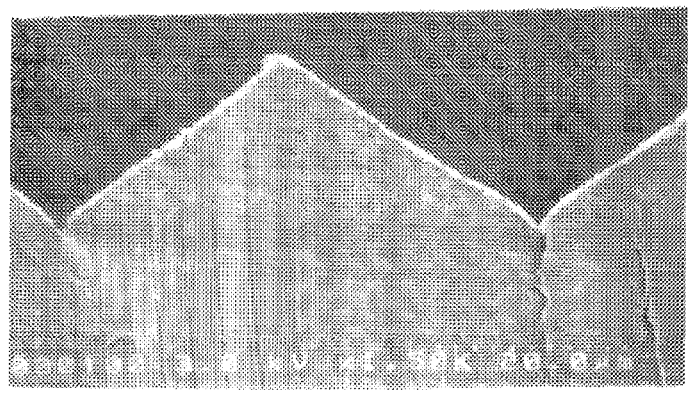
Figure 7C:
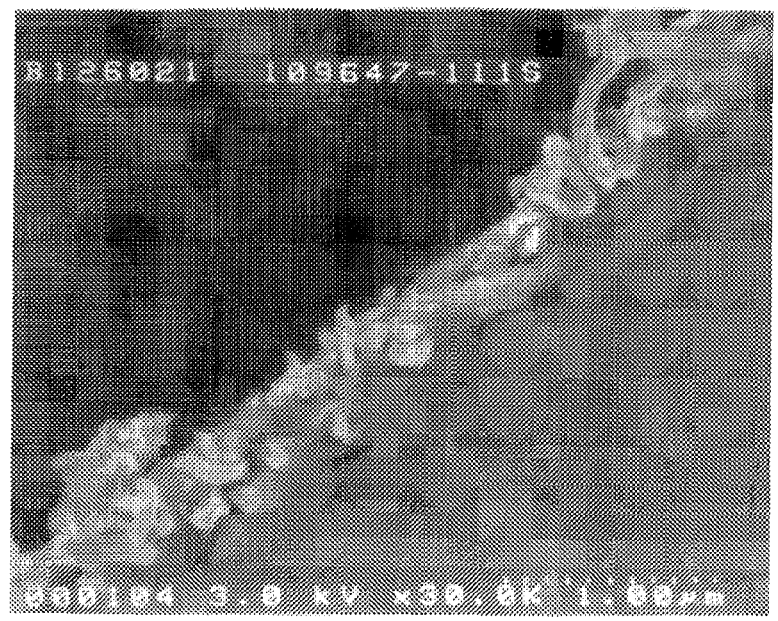

It has been discovered that the thin electrode layers can be imparted with microtextures having features sized in the 1-50 microns range, so that the catalyzed membrane surface is also replicated with these microtextures. FIGS. 7A-7C are scanning electron micrographs of a cross section of such an catalyst coated membrane (CCM) surface where the nanostructured electrode layer conforms to a microtextured shape of 25 micrometer high peaks and valleys, taken at 500×, 5,000× and 30,000×, respectively. The actual electrode layer surface area per unit planar area of CCM (measured normal to the stacking axis of the CCM) is increased by the geometric surface area factor of the microtextured substrate. In the example illustrated in FIG. 7A, this factor is 1.414, or the square root of two, since each part of the surface is at a 45° angle to the normal to the plane of the MCTS. In addition, the feature size of the microtextures can be made relatively small compared to the thickness of the ICM.

The microtextures can be imparted by any effective method. One preferred method is to form the nanostructures on an initial substrate that is microtextured, denoted herein as a microtextured catalyst transfer substrate (MCTS). The microtextures are imparted to the CCM during the step of transferring the nanostructured elements to the ICM, and remain after the initial substrate is stripped away. The conditions of nanostructure and CCM formation are the same as described above. Another method is to impress or mold the microtexture into a formed CCM. It is not necessary that the microtextures be uniformly geometric. Randomly sized and arrayed features can serve the same purpose.

The increase in actual catalyst area per unit CCM volume by microtexturing the catalyst electrode area can be achieved when the catalyst layer is sufficiently thin, about an order of magnitude thinner than the size of the microtexture features, and those microtexture features are smaller than the thickness of the ion exchange membrane. For example, the thickness of the catalyzed surface region of the ICM in this invention can be 2 microns or less. The width of the microtextured features may be about 12 microns and the peak to valley height of the microtextured features may be about 6 microns, and the thickness of the ICM membrane can be 25 microns or larger.

When the microtextures are imparted by use of a microtextured substrate for the nanostructured support elements of this invention, two further advantages appear in the process for applying the catalyst and forming the CCM. In some embodiments, a key aspect for membrane transfer applications, e.g., fuel cells and/or electrolyzers, of the support particles of this invention is that they be applied to a substrate from which they can be transferred to the membrane surface. This requirement may result in support particles which are easily brushed off a flat substrate or damaged by winding up such a flat substrate around a core, such as would be done in a continuous web coating process. Having the nanostructured catalyst support elements on a microtextured substrate can prevent the possibility of damage because the vast majority of the much smaller catalyst coated support particles will reside in the valleys, below the peaks which will protect them from damage on roll-up. A second process advantage provided by the microtextured substrate may be realized in the process of transferring the catalyzed support particles into the ICM surface. Often heat and pressure may be used, and removing air from the interface at the start of the pressing process can be important, such as by applying a vacuum. When transferring from large pieces of planar substrate carrying the catalyst support particles, air can be trapped between the ICM and the support substrate. Having the microtextured peaks to space the ICM and substrate apart during evacuation can allow this air to be more effectively removed in the moments just before the press-transfer commences.

The catalyst layers of the present invention are particularly useful in electrochemical devices such as fuel cells, batteries, electrolyzers, electrochemical reactors such as chlor-alkali separation membranes, or gas, vapor or liquid sensors, using membrane electrodes optimized for the immediate purpose.

Figure 8A:
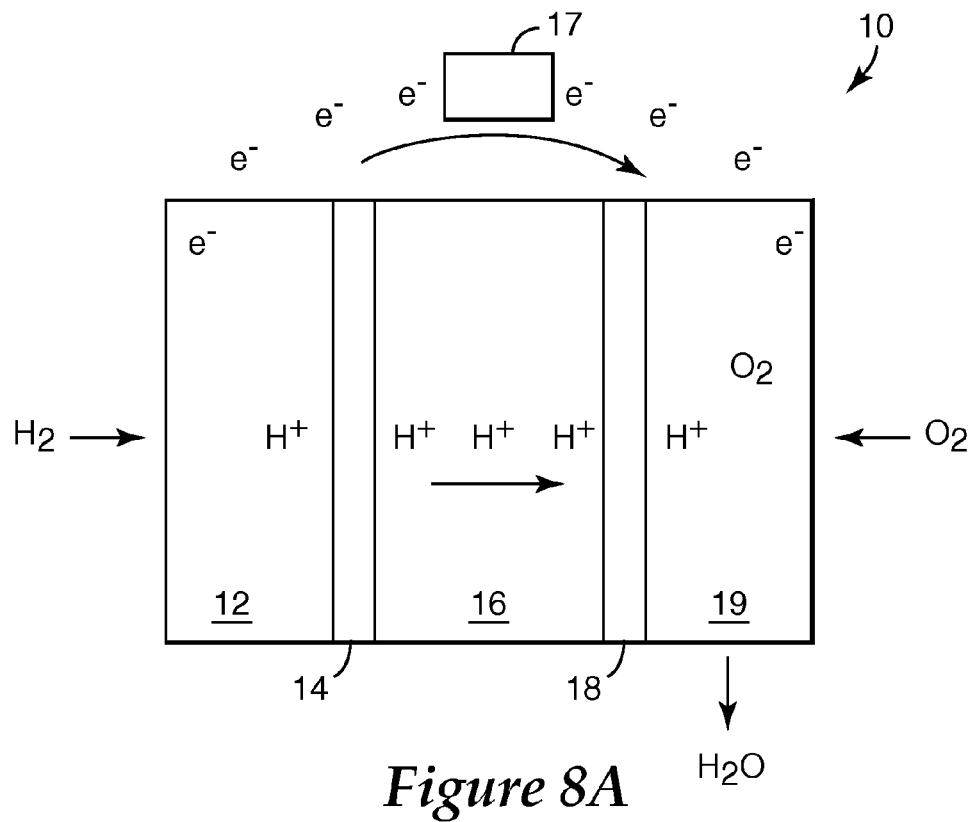
FIG. 8A illustrates a fuel cell that utilizes one or more catalyst layers in accordance with embodiments of the invention.

MEAs formed using the catalyst layers of the present invention may be incorporated in fuel cell assemblies and stacks of varying types, configurations, and technologies. A typical fuel cell is depicted in FIG. 8A. A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated at much higher efficiencies than internal combustion electric generators, for example.

The fuel cell 10 shown in FIG. 8A includes a DCC 12 adjacent an anode 14. Adjacent the anode 14 is an ion conductive membrane (ICM) 16. A cathode 18 is situated adjacent the ICM 16, and a second DCC 19 is situated adjacent the cathode 18. In operation, hydrogen fuel is introduced into the anode portion of the fuel cell 10, passing through the first DCC 12 and over the anode 14. At the anode 14, the hydrogen fuel is separated into hydrogen ions ($H^+$) and electrons ($e^-$).

The ICM 16 permits only the hydrogen ions or protons to pass through the ICM 16 to the cathode portion of the fuel cell 10. The electrons cannot pass through the ICM 16 and, instead, flow through an external electrical circuit in the form of electric current. This current can power an electric load 17, such as an electric motor, or be directed to an energy storage device, such as a rechargeable battery.

Oxygen flows into the cathode side of the fuel cell 10 via the second DCC 19. As the oxygen passes over the cathode 18, oxygen, protons, and electrons combine to produce water and heat.

Individual fuel cells, such as that shown in FIG. 8A, can be packaged as unitized fuel cell assemblies as described below.

The unitized fuel cell assemblies, referred to herein as unitized cell assemblies (UCAs) or multi-cell assemblies (MCAs), can be combined with a number of other UCAs/MCAs to form a fuel cell stack. The UCAs/MCAs may be electrically connected in series with the number of UCAs/MCAs within the stack determining the total voltage of the stack, and the active surface area of each of the cells determines the total current. The total electrical power generated by a given fuel cell stack can be determined by multiplying the total stack voltage by total current.

Figure 8B:
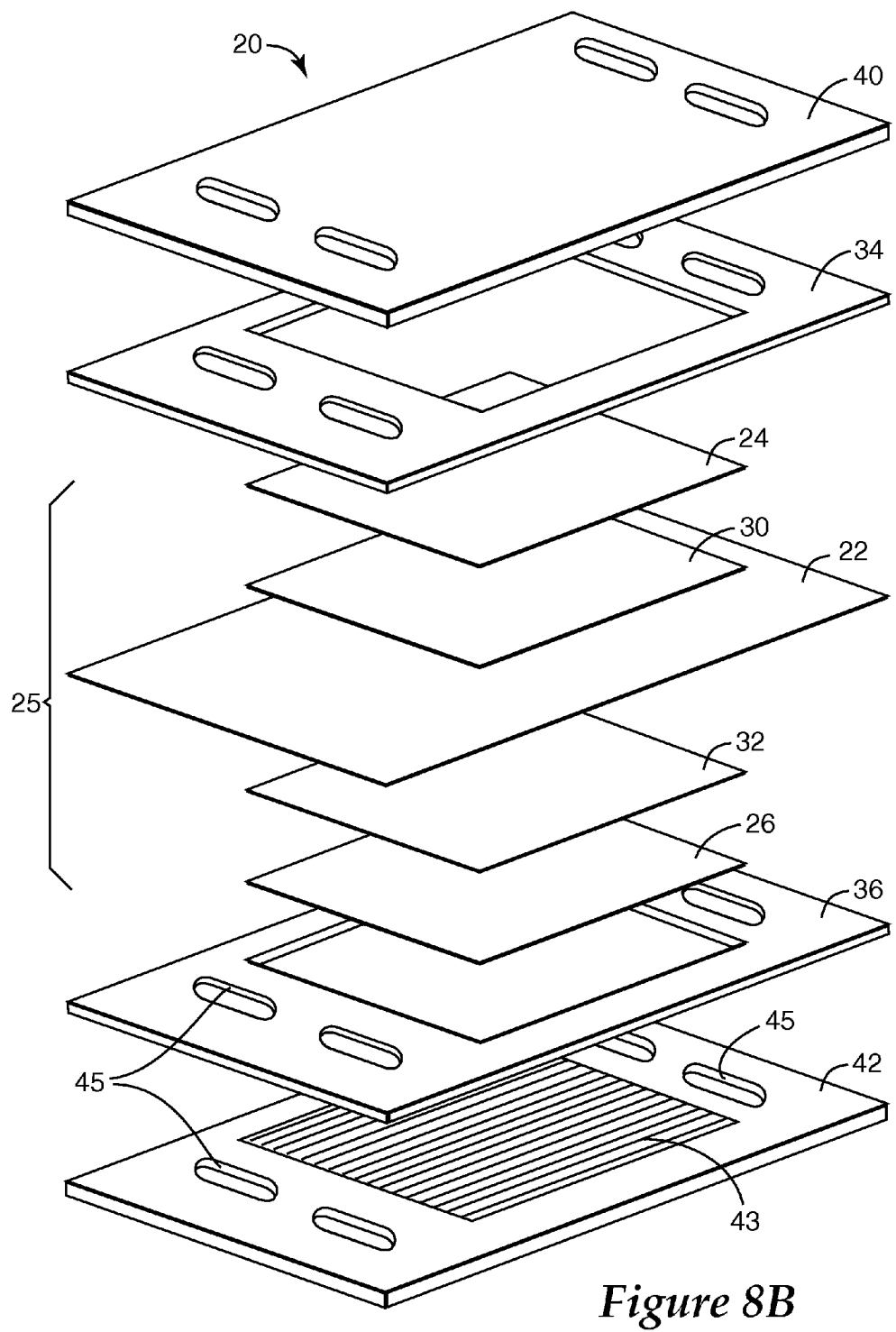
FIG. 8B illustrates an embodiment of a unitized cell assembly comprising MEAs formed in accordance with embodiments of the invention.

Referring now to FIG. 8B, there is illustrated an embodiment of a UCA implemented in accordance with a PEM fuel cell technology. As is shown in FIG. 8B, a membrane electrode assembly (MEA) 25 of the UCA 20 includes five component layers. An ICM layer 22 is sandwiched between a pair of DCCs An anode 30 is situated between a first DCC 24 and the membrane 22, and a cathode 32 is situated between the membrane 22 and a second DCC 26. Alternatively, the UCA can contain 2 or more MEAs to form a multi-cell assembly (MCA).

In one configuration, an ICM layer 22 is fabricated to include an anode catalyst layer 30 on one surface and a cathode catalyst layer 32 on the other surface. This structure is often referred to as a catalyst-coated membrane or CCM. According to another configuration, the first and second DCCs 24, 26 are fabricated to include an anode and cathode catalyst layer 30, 32, respectively. In yet another configuration, an anode catalyst coating 30 can be disposed partially on the first DCC 24 and partially on one surface of the ICM 22, and a cathode catalyst coating 32 can be disposed partially on the second DCC 26 and partially on the other surface of the ICM 22.

The DCCs 24, 26 are typically fabricated from a carbon fiber paper or non-woven material or woven cloth. Depending on the product construction, the DCCs 24, 26 can have carbon particle coatings on one or both sides. The DCCs 24, 26, as discussed above, can be fabricated to include or exclude a catalyst coating.

In the particular embodiment shown in FIG. 8B, MEA 25 is shown sandwiched between a first edge seal system 34 and a second edge seal system 36. Adjacent the first and second edge seal systems 34 and 36 are flow field plates 40 and 42, respectively. Each of the flow field plates 40, 42 includes a field of gas flow channels 43 and ports 45 through which hydrogen and oxygen feed fuels pass. In the configuration depicted in FIG. 8B, flow field plates 40, 42 are configured as monopolar flow field plates, in which a single MEA 25 is sandwiched there between.

The edge seal systems 34, 36 provide the necessary sealing within the UCA package to isolate the various fluid (gas/liquid) transport and reaction regions from contaminating one another and from inappropriately exiting the UCA 20, and may further provide for electrical isolation and hard stop compression control between the flow field plates 40, 42.

Figure 9:
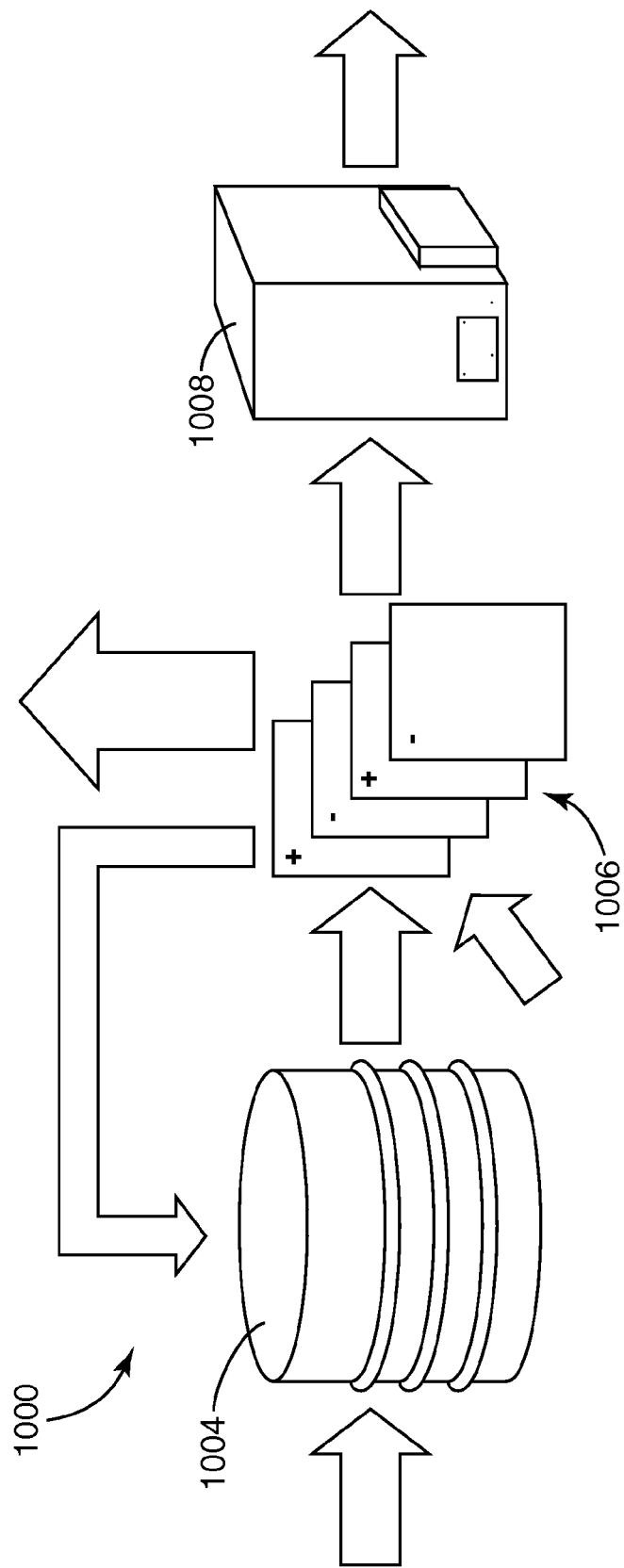
FIGS. 9-12 depict possible systems in which a fuel cell assembly as illustrated by the embodiments herein may be utilized.
Figure 10:
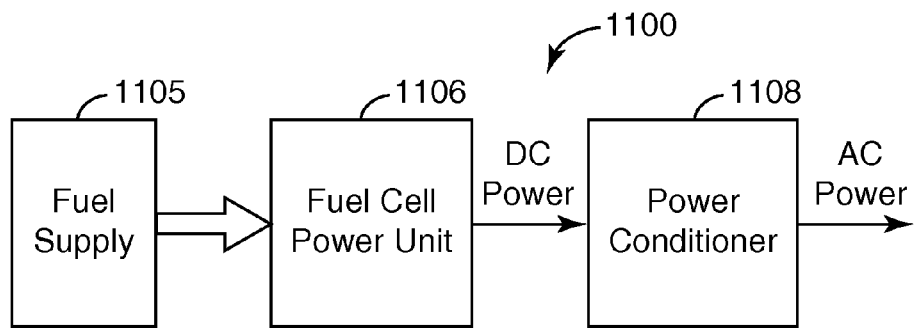
Figure 11:
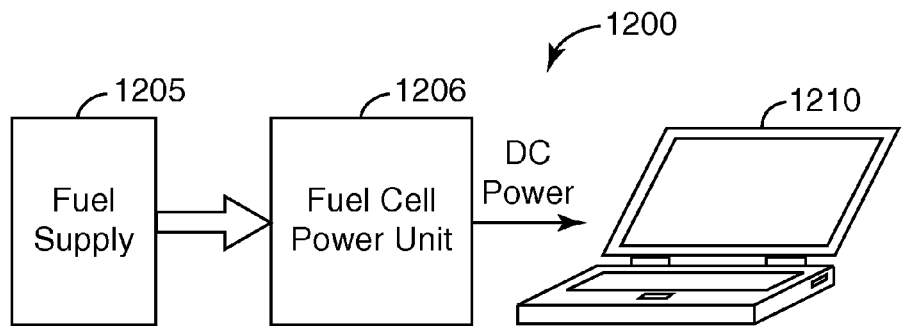

FIGS. 9-11 illustrate various fuel cell systems for power generation that may incorporate fuel cell assemblies having catalyst layers formed as described herein. The fuel cell system 1000 shown in FIG. 9 depicts one of many possible systems in which a fuel cell assembly as illustrated by the embodiments herein may be utilized.

The fuel cell system 1000 includes a fuel processor 1004, a power section 1006, and a power conditioner 1008. The fuel processor 1004, which includes a fuel reformer, receives a source fuel, such as natural gas, and processes the source fuel to produce a hydrogen rich fuel. The hydrogen rich fuel is supplied to the power section 1006. Within the power generation section 1006, the hydrogen rich fuel is introduced into the stack of UCAs of the fuel cell stack(s) contained in the power section 906. A supply of air is also provided to the power generation section 1006, which provides a source of oxygen for the stack(s) of fuel cells.

The fuel cell stack(s) of the power generation section 1006 produce DC power, useable heat, and clean water. In a regenerative system, some or all of the byproduct heat can be used to produce steam which, in turn, can be used by the fuel processor 1004 to perform its various processing functions. The DC power produced by the power generation section 1006 is transmitted to the power conditioner 1008, which converts DC power to AC power or to DC power at a different voltage for subsequent use. It is understood that AC power conversion need not be included in a system that provides DC output power.

FIG. 10 illustrates a fuel cell power supply 1100 including a fuel supply unit 1105, a fuel cell power generation section 1106, and a power conditioner 1108. The fuel supply unit 1105 includes a reservoir that contains hydrogen fuel which is supplied to the fuel cell power generation section 1106. Within the power section 1106, the hydrogen fuel is introduced along with air or oxygen into the fuel cell stack(s) contained in the power generation section 1106.

The power generation section 1106 of the fuel cell power supply system 1100 produces DC power, useable heat, and clean water. The DC power produced by the power generation section 1106 may be transmitted to the power conditioner 1108, for DC to AC conversion or DC to DC conversion, if desired. The fuel cell power supply system 1100 illustrated in FIG. 24 may be implemented as a stationary or portable AC or DC power generator, for example.

In the implementation illustrated in FIG. 11, a fuel cell system uses power generated by a fuel cell power supply to provide power to operate a computer. As described in connection with FIG. 11, fuel cell power supply system includes a fuel supply unit 1205 and a fuel cell power generation section 1206. The fuel supply unit 1205 provides hydrogen fuel to the fuel cell power generation section 1206. The fuel cell stack(s) of the power generation section 1206 produce power that is used to operate a computer 1210, such as a desk top or laptop computer.

Figure 12:
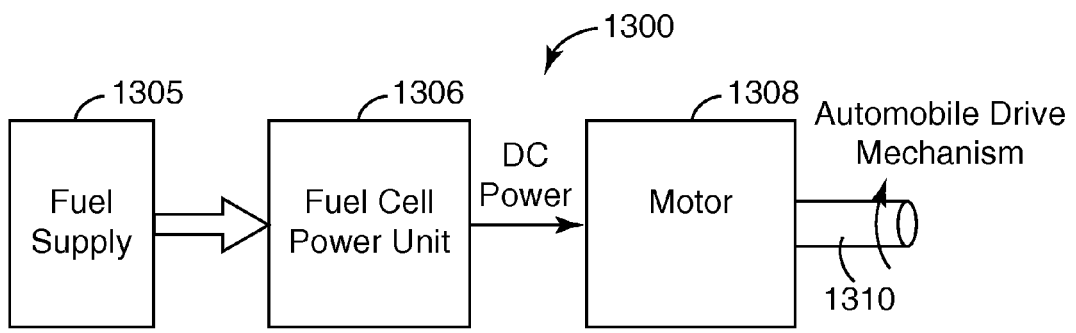

In another implementation, illustrated in FIG. 12, power from a fuel cell power supply is used to operate an automobile 1310. In this configuration, a fuel supply unit 1305 supplies hydrogen fuel to a fuel cell power generation section 1306. The fuel cell stack(s) of the power section 1306 produce power used to operate a motor 1308 coupled to a drive mechanism of the automobile 1310.

EXAMPLE 1

Use of Lower Activity Catalyst for Greater Uniformity

Figure 13:
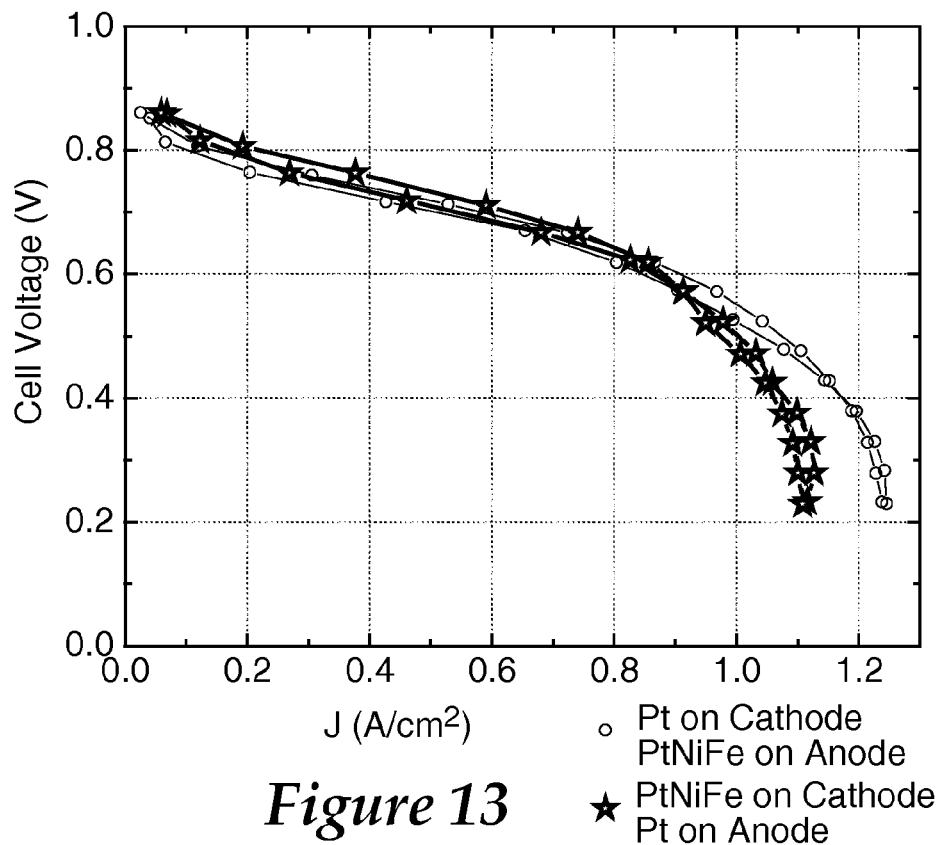
FIG. 13 shows graphs of potentiodynamic polarization curves from nanostructured MEA's having two different catalyst activities.

As previously discussed, one way to obtain a more uniform distribution of current densities and temperatures across the active area of the MEA is to use a uniform distribution of a less active catalyst, e.g. by limiting the activity of the catalyst to a ECSA or surface enhancement factor (SEF) maximum, for example, a maximum of 50 $cm^2/cm^2$ surface area enhancement per unit planar area for a dispersed catalyst. FIG. 13 shows graphs of potentiodynamic polarization curves from a nanostructured MEA having different catalyst activities on the cathode and anode. In this example, the loading, catalyst area specific activity and the catalyst mass specific area are different. The nanostructured MEA has two different catalysts on the anode and cathode so when reversed, each could be measured under the same conditions.

In FIG. 13, the nanostructured MEA has 0.1 mg/cm$^2$ of Pt on one side and 0.15 mg/cm$^2$ of Pt in a PtNiFe ternary catalyst as the other side. The surface enhancement factor (SEF) of the pure Pt is about 10 and the Pt permalloy ternary about 18. The polarization curves were first obtained with the PtNiFe on the cathode and then the gas flows and leads were reversed to place the PtNiFe on the fuel cell anode. As seen the higher SEF cathode catalyst gives considerably better performance in the kinetic region, above 0.75 volts, but worse performance in the mass transport limiting region above 1 A/cm$^2$. Without being bound by theory, even though the same average current is being produced by the cell, for example, 1.1 A/cm$^2$, in both cases, in the case with the higher SEF catalyst on the cathode, the current is being produced by a smaller effective area of the MEA, so the water generation rate per unit area is higher in that active area, leading to worse flooding and hence more overpotential.

The examples illustrated by FIG. 13 show that to obtain a more uniform distribution of generated water, and thus less severe flooding, it is better to use a uniform distribution of a less active (lower SEF) catalyst.

EXAMPLE 2

Gradient Catalyst Activity for Enhanced Performance and Uniformity

To obtain either a more uniform distribution of temperature and water, which will directly affect durability, it is advantageous to use a uniform distribution of a lower activity catalyst, as shown by Example 1. But as seen in FIG. 13, this causes the performance to degrade in the kinetic controlled region above about 0.75 volts, compared to what might be achieved with a more active catalyst. So the challenge is to remove the non-uniformities in reactivity but also optimize the performance at all voltages.

A solution to this problem is to use a gradient in catalyst activity along the direction from the inlet to the flow fields to their outlets. Having a lower catalyst activity near the inlet where the reactant concentrations are higher, and a higher catalyst activity near the outlets, where the reactant concentrations are lower (due to both consumption and higher accumulated water of generation on the cathode) will force the local reaction rates, current density and temperatures to be more uniform from inlets to outlets of the flow field. A variation in catalyst activity can be achieved by having a varying ECSA, which in turn can be obtained by using a variable loading of catalyst.

For a carbon supported dispersed catalyst, one way to obtain a gradient in the catalyst activity from one side of an MEA to the other, would be to coat a non-uniform loading of the catalyst/ionomer containing ink from one side of the MEA to the other such that at the side closest to the inlets of the final fuel cell assembly, the loading is smallest. In a web coating process, this could be done by having a die coating device which applies a thickness gradient of the wet ink across the web width.

Figure 15:
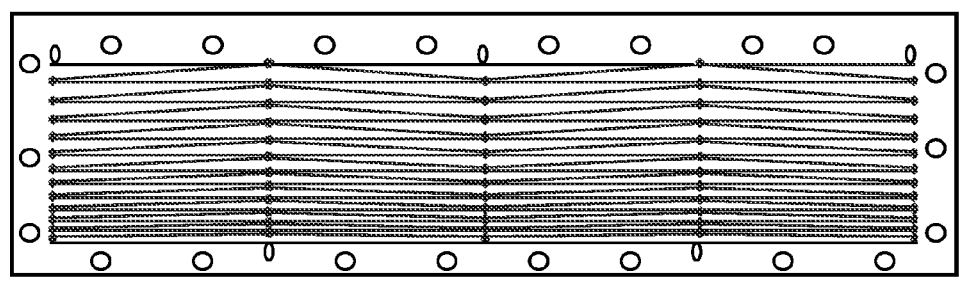
FIG. 15 illustrates a suitable flow field design for use with MEAs having catalyst layers formed in accordance with embodiments of the invention.
Figure 14:
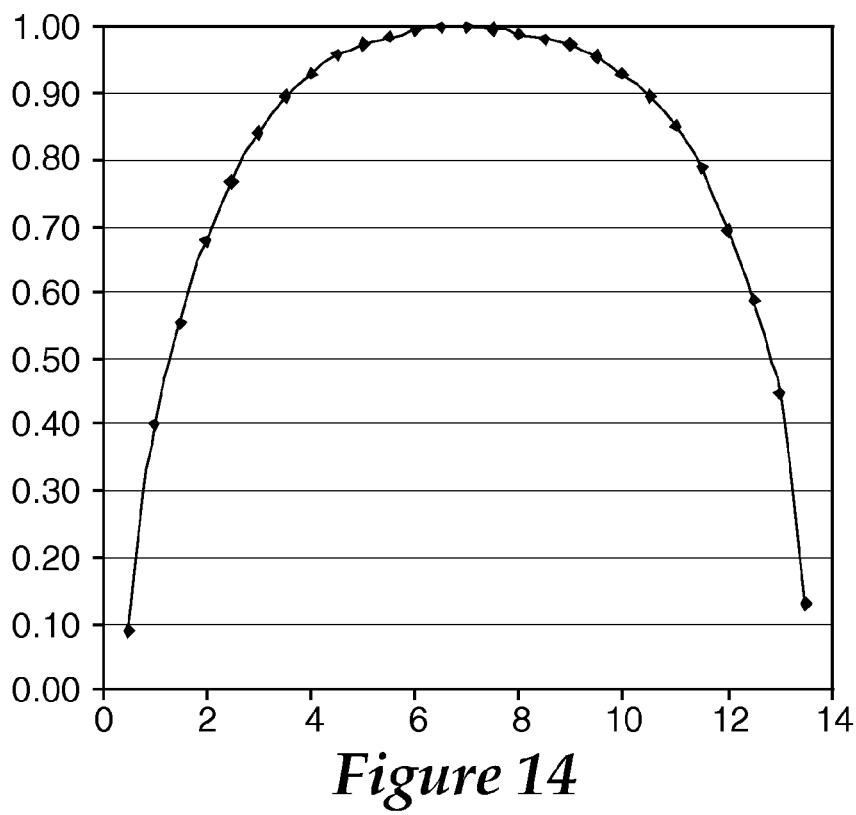
FIG. 14 shows catalyst loading distribution of a permalloy deposition across a 12 inch wide web in accordance with embodiments of the invention.

For the nanostructured thin film (NSTF) catalysts, a particularly useful manufacturing method to obtain a variation of the catalyst loading or activity can be automatically achieved during sputter deposition of catalyst onto the PR149 nanostructured supports by allowing the deposition rate onto a moving web (the transfer substrate) to be higher in the middle of the web than on the edges. This is the natural tendency for linear deposition sources such as planar or cylindrical magnetrons, because the middle gets deposited material from both sides of the sputtering targets, while the edges do not. In fact, masking is often used to get a uniform cross-web deposition. This masking reduces the total deposition rate, which lowers the effective yields of the targets, so it is desirable if it is not necessary to use a mask, as in this invention. FIG. 14 shows distribution of a permalloy deposition across a 12 inch wide web. If only a single catalyst material was used, such as Pt, the result is a catalyst loading that is higher in the middle of the web than the edges, and after transferring this catalyst to a PEM membrane, such as by lamination between calendaring rolls, a CCM (catalyst coated membrane) having a higher loading in the middle than the edges. If this roll of CCM had a width 2 W, and was slit down the middle, then it would produce two rolls of CCM, each of width W, having a higher loading of Pt on one edge than the other edge. For example, a 10 inch wide laminated CCM could be slit into two 5 inch wide rolls. If now MEA's are made from this coated roll by cutting off rectangular pieces and mounting them with DCCs into a stack which has flow field distributions that in general distribute the gases from one edge of the MEA to the other, parallel to the direction of the gradient in catalyst loading on the CCM, the desired result would be achieved. An example of a suitable flow field design is shown in FIG. 15, consisting of 4, 50 cm$^2$ zig-zag flow fields, with inlets on one side of the 200 cm$^2$, rectangular active area, and outlets on the other side.

An example of a catalyst loading gradient in accordance with one embodiment comprises 0.1 mg/cm$^2$ of Pt on the entrance edge of the CCM and 0.2 mg/cm$^2$ on the exit side of the CCM so that the average is 0.15 mg/cm$^2$. The catalyst distribution between the entrance edge and the exit edge could be any distribution. Clearly, the amount of catalyst at the edges could be any desired amount.

In the preferred implementations, a mixed metal catalyst may be used, such as a Pt-permalloy ternary catalyst, in which the permalloy (80% Ni, 20% Fe) and Pt are in 1:1 volume ratios approximately as in commonly owned U.S. Patent Application Publication Number 2005069755A which is incorporated herein by reference. In this configuration, Pt/permalloy ratio can determine the effective activity of the catalyst. A gradient in catalyst activity may be achieved by varying the Pt/permalloy ratio across the width of the CCM. A gradient in catalyst activity may also be accomplished by having the permalloy target masked differently from the Pt.

Figure 16A:
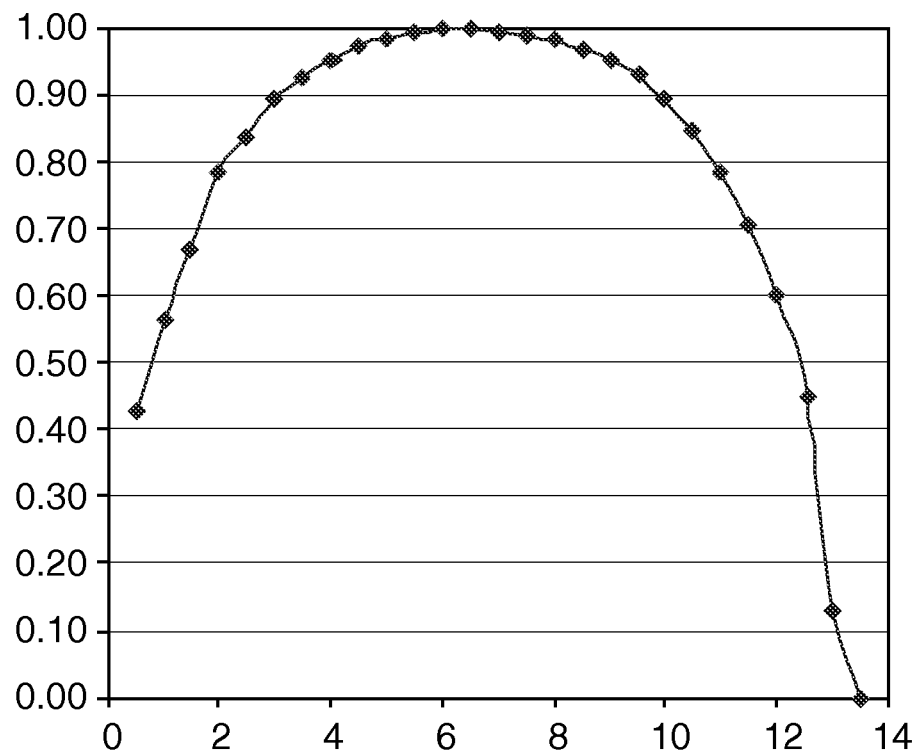
FIGS. 16A and 16B illustrate a first loading profile produced by a single magnetron sputtering source and the shaping shields used, respectively, in accordance with embodiments of the invention.
Figure 16B:
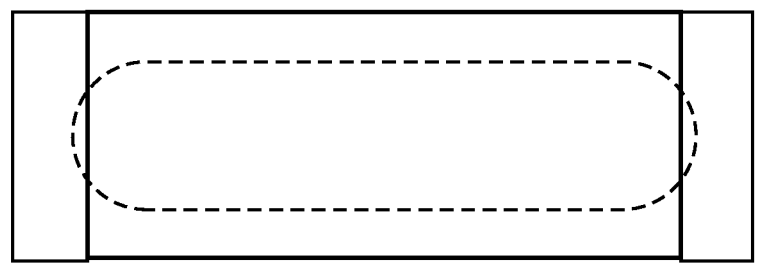
Figure 17A:
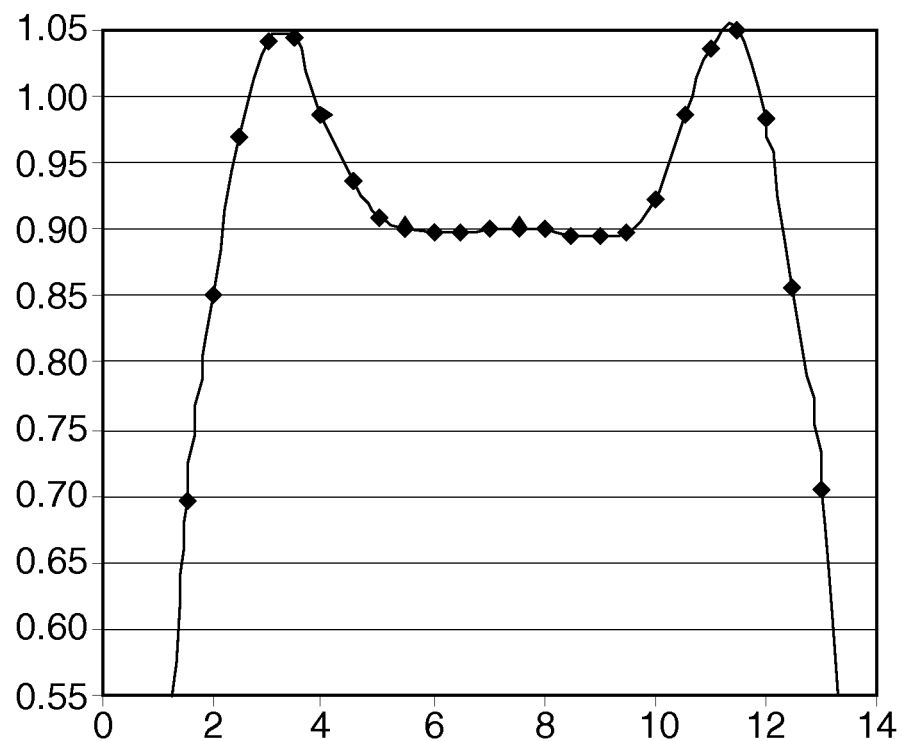
FIGS. 17A and 17B illustrate a second loading profile produced by a single magnetron sputtering source and the shaping shields used, respectively, in attempts to build a uniform loading profile.
Figure 17B:
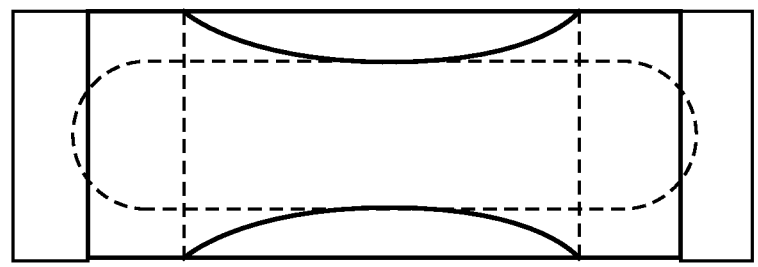

FIGS. 16A and 17A illustrate two representative cross web loading profiles for a single source along with representative cartoons of the shaping shields used, FIGS. 16B and 17B.

FIG. 16A illustrates the loading profile produced by a single magnetron sputtering source without any shaping shields. The catalyst loading distribution shows the anticipated large broad peak in the center of the substrate. FIG. 16B shows the shields used. The dimensions of the source (the light rectangle) is 15" wide and the opening in the shield (dark rectangle) is 12" wide. The dotted line is the sputtering "racetrack" where the deposition originates.

FIG. 17A illustrates another deposition distribution and a corresponding shield (FIG. 18B). By obscuring some of the deposition at the ends, the center is brought up relative to the ends. The catalyst deposition illustrated by FIGS. 16A and 17A are very different. The last set of data (FIG. 17A) is uniform to +/−5% over 10 inches.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. An article, comprising a single catalyst layer having a width and a length, wherein the length is longer than the width, and wherein the single catalyst layer has a catalyst activity profile comprising at least one positive slope and at least one negative slope across the width of the single catalyst layer and having substantially zero slope along the length of the single catalyst layer.

2. The article of claim 1, further comprising a substrate, wherein the single catalyst layer is formed on the substrate.

3. The article of claim 2, wherein the substrate comprises a microtextured surface.

4. The article of claim 1, wherein the single catalyst layer comprises a nanostructured thin film catalyst layer.

5. The article of claim 1, wherein the single catalyst layer comprises a dispersion coating.

6. The article of claim 1, further comprising an electrically conductive microporous layer, wherein the single catalyst layer is formed on the electrically conductive microporous layer.

7. The article of claim 1, wherein the catalyst activity profile further comprises at least one zero slope across the width of the single catalyst layer.

\* \* \* \* \*

UNITED STATES PATENT AND TRADEMARK OFFICE
CERTIFICATE OF CORRECTION

| | | |
|---|---|---|
| PATENT NO. | : 8,481,185 B2 | Page 1 of 1 |
| APPLICATION NO. | : 12/845894 | |
| DATED | : July 9, 2013 | |
| INVENTOR(S) | : Susan Maier Hendricks | |

It is certified that error appears in the above-identified patent and that said Letters Patent is hereby corrected as shown below:

Title Page 2
Column 2, item (56), (Other Publications); Line 25; Delete "ASnd" and insert -- And --, therefor.

In the Drawing
Sheet 1 of 15 (y-axis) (Figure 1)
Line 1; Delete "nondimensionlized" and insert -- nondimensionalized --, therefor.

In the Specification
Column 1
Line 45; Delete "chloroplatnic" and insert -- chloroplatinic --, therefor.

Column 10
Line 20; Delete "polyamids" and insert -- polyamides --, therefor.

Column 15
Line 2; Delete "alkalai metal" and insert -- alkali metal --, therefor.
Line 2; Delete "alkalai earth" and insert -- alkali earth --, therefor.
Line 4-5; Delete "alkalai metal" and insert -- alkali metal --, therefor.
Line 5; Delete "alkalai earth" and insert -- alkali earth --, therefor.
Line 19; Delete "dialky siloxanes" and insert -- dialkyl siloxanes --, therefor.
Line 23; Delete "alkalai" and insert -- alkali --, therefor.
Line 24; Delete "alkalai" and insert -- alkali --, therefor.

Column 16
Line 1; Delete "cyclopetadiene" and insert -- cyclopentadiene --, therefor.

Signed and Sealed this
Twenty-eighth Day of January, 2014

Michelle K. Lee
*Deputy Director of the United States Patent and Trademark Office*